United States Patent
Isenhour et al.

(10) Patent No.: US 9,507,096 B2
(45) Date of Patent: Nov. 29, 2016

(54) FIBER OPTIC CONNECTORS EMPLOYING MOVEABLE OPTICAL INTERFACES WITH FIBER PROTECTION FEATURES AND RELATED COMPONENTS AND METHODS

(71) Applicant: Corning Optical Communications LLC, Hickory, NC (US)

(72) Inventors: Micah Colen Isenhour, Lincolnton, NC (US); Dennis Michael Knecht, Hickory, NC (US); James Phillip Luther, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 15/066,337

(22) Filed: Mar. 10, 2016

(65) Prior Publication Data
US 2016/0187593 A1 Jun. 30, 2016

Related U.S. Application Data

(62) Division of application No. 13/558,978, filed on Jul. 26, 2012, now Pat. No. 9,304,265.

(51) Int. Cl.
*G02B 6/36* (2006.01)
*G02B 6/38* (2006.01)

(52) U.S. Cl.
CPC ........... *G02B 6/3866* (2013.01); *G02B 6/3823* (2013.01); *G02B 6/3829* (2013.01); *G02B 6/3853* (2013.01); *G02B 6/3885* (2013.01);

(Continued)

(58) Field of Classification Search
CPC ...... G02B 6/32; G02B 6/322; G02B 6/4204; G02B 6/327; G02B 6/4292
USPC .......................................................... 385/79
See application file for complete search history.

(56) References Cited

U.S. PATENT DOCUMENTS

| 4,213,677 A | 7/1980 | Sugimoto et al. |
| 4,268,112 A | 5/1981 | Peterson |

(Continued)

FOREIGN PATENT DOCUMENTS

| AU | 199898138 B2 | 8/1999 |
| EP | 1091223 A2 | 4/2001 |

(Continued)

OTHER PUBLICATIONS

W. J. Tomlinson, "Applications of GRIN-rod lenses in optical fiber communications systems," Applied Optics, Apr. 1, 1980, vol. 19, No. 7, pp. 1127-1138.

(Continued)

*Primary Examiner* — Jerry Blevins

(57) ABSTRACT

Embodiments disclosed herein include fiber optic connectors employing a movable optical interface connected by optical fibers to a fiber optic cable, components and methods. In one embodiment, the movable optical interface moves between an extended position for cleaning by the user of the movable optical interface and a retracted position to optically connect the fiber optic connector to an optical device in a mechanically-secure manner. Because the fiber optic cable employs the movable optical interfaces, embodiments described herein involve one or more fiber protection features to prevent optical fiber attenuation and/or damage to the end portions of the optical fibers.

12 Claims, 22 Drawing Sheets

(52) U.S. Cl.
CPC ............ *G02B 6/3887* (2013.01); *G02B 6/3821* (2013.01); *Y10T 29/49826* (2015.01)

(56) References Cited

U.S. PATENT DOCUMENTS

| | | | |
|---|---|---|---|
| 4,701,011 | A | 10/1987 | Emkey et al. |
| 5,172,271 | A | 12/1992 | Sinclair |
| 5,384,874 | A | 1/1995 | Hirai et al. |
| 5,784,512 | A | 7/1998 | Hensen |
| 5,832,153 | A | 11/1998 | Duck |
| 5,850,493 | A | 12/1998 | Cheng |
| 5,923,802 | A | 7/1999 | Giebel et al. |
| 6,012,852 | A | 1/2000 | Kadar-Kallen et al. |
| 6,033,125 | A | 3/2000 | Stillie et al. |
| 6,157,485 | A | 12/2000 | Cheng |
| 6,246,026 | B1 | 6/2001 | Vergeest |
| 6,398,424 | B1 | 6/2002 | Jin et al. |
| 6,485,189 | B1 | 11/2002 | Gilliland et al. |
| 6,542,665 | B2 | 4/2003 | Reed et al. |
| 6,632,025 | B2 | 10/2003 | Ukrainczyk |
| 6,655,850 | B2 | 12/2003 | Mann et al. |
| 6,687,434 | B2 | 2/2004 | Ishikawa |
| 6,736,547 | B2 | 5/2004 | Stevens et al. |
| 6,837,625 | B2 | 1/2005 | Schott et al. |
| 6,848,834 | B1 | 2/2005 | Roehrs et al. |
| 6,899,464 | B2 | 5/2005 | Stevens et al. |
| 6,963,687 | B2 | 11/2005 | Vergeest et al. |
| 7,077,576 | B2 | 7/2006 | Luther et al. |
| 7,104,701 | B1 | 9/2006 | Durrant et al. |
| 7,329,050 | B1 | 2/2008 | Dugan et al. |
| 7,346,236 | B2 | 3/2008 | Asano et al. |
| 7,346,237 | B2 | 3/2008 | Matsumura et al. |
| 7,357,005 | B2 | 4/2008 | Matsumura et al. |
| 7,460,750 | B2 | 12/2008 | Durrant et al. |
| 7,572,071 | B1 | 8/2009 | Wu |
| 7,603,008 | B2 | 10/2009 | Matsumura et al. |
| 7,775,725 | B2 | 8/2010 | Grinderslev |
| 2002/0146211 | A1 | 10/2002 | Stevens et al. |
| 2003/0012513 | A1 | 1/2003 | Ukrainczyk |
| 2003/0021543 | A1 | 1/2003 | Mann et al. |
| 2003/0233138 | A1* | 12/2003 | Spooner ............... A61B 18/203 607/93 |
| 2004/0009697 | A1 | 1/2004 | Clark et al. |
| 2006/0222299 | A1 | 10/2006 | Durrant et al. |
| 2008/0044137 | A1 | 2/2008 | Luther et al. |
| 2008/0050072 | A1 | 2/2008 | Durrant et al. |
| 2008/0166094 | A1 | 7/2008 | Bookbinder et al. |
| 2008/0279509 | A1 | 11/2008 | Durrant et al. |
| 2009/0041412 | A1 | 2/2009 | Danley et al. |
| 2009/0169163 | A1 | 7/2009 | Abbott, III et al. |
| 2009/0324175 | A1 | 12/2009 | Everett et al. |
| 2009/0324176 | A1 | 12/2009 | Cheng et al. |
| 2010/0027943 | A1 | 2/2010 | Armani et al. |
| 2010/0104244 | A1 | 4/2010 | Grinderslev |
| 2010/0178007 | A1 | 7/2010 | Thomson et al. |
| 2010/0215325 | A1 | 8/2010 | Tamura et al. |
| 2010/0270350 | A1* | 10/2010 | Bylander ............... B26F 3/002 225/2 |
| 2011/0142408 | A1 | 6/2011 | Geens et al. |
| 2011/0229090 | A1 | 9/2011 | Isenhour et al. |
| 2012/0099822 | A1 | 4/2012 | Kuffel et al. |
| 2012/0155803 | A1 | 6/2012 | Benjamin et al. |
| 2012/0163754 | A1 | 6/2012 | Benjamin et al. |

FOREIGN PATENT DOCUMENTS

| | | |
|---|---|---|
| GB | 2154333 A | 9/1985 |
| JP | 63-293510 | 11/1988 |
| WO | WO01/11409 A2 | 2/2001 |
| WO | WO03/076993 A1 | 9/2003 |
| WO | WO 2012/015734 A1 | 2/2012 |

OTHER PUBLICATIONS

Emkey, et al., "Analysis and Evaluation of Graded-Index Fiber-Lenses," Journal of Lightwave Technology, vol. LT-5, No. 9, Sep. 1987, pp. 1156-1164.

Palais, Joseph C, "Fiber coupling using graded-index rod lenses," Applied Optics, Jun. 15, 1980, vol. 19, No. 12, pp. 2011-2018.

http:\\www.cvimellesgroit.com, "Gradient-Index Lenses".

Chanclou, et al., "Design and demonstration of a multicore single-mode fiber coupled lens device," Optics Communications 233, 2004, pp. 333-339.

Senior, et al., "Misalignment losses at multimode graded-index fiber splices and GRIN rod lens couplers," Applied Optics, Apr. 1, 1985, vol. 24, No. 7, pp. 977-983.

Gilsdorf, et al., "Single-mode fiber coupling efficiency with graded-index rod lenses," Applied Optics, Jun. 1, 1994, vol. 33, No. 16, pp. 3440-3445.

Cusworth, et al., "Angular tilt misalignment loss at a GRIN rod lens coupler," Applied Optics, Jun. 1, 1986, vol. 25, No. 11, pp. 1775-1779.

Patent Cooperation Treaty, International Search Report and Written Opinion, May 24, 2011, 8 pgs.

Patent Cooperation Treaty Form ISA/210, International Application No. PCT/US2013/051456, mailing date Sep. 2, 2013—5 pages.

Patent Cooperation Treaty Form ISA/237, International Application No. PCT/US2013/051456, mailing date Sep. 2, 2013—4 pages.

\* cited by examiner

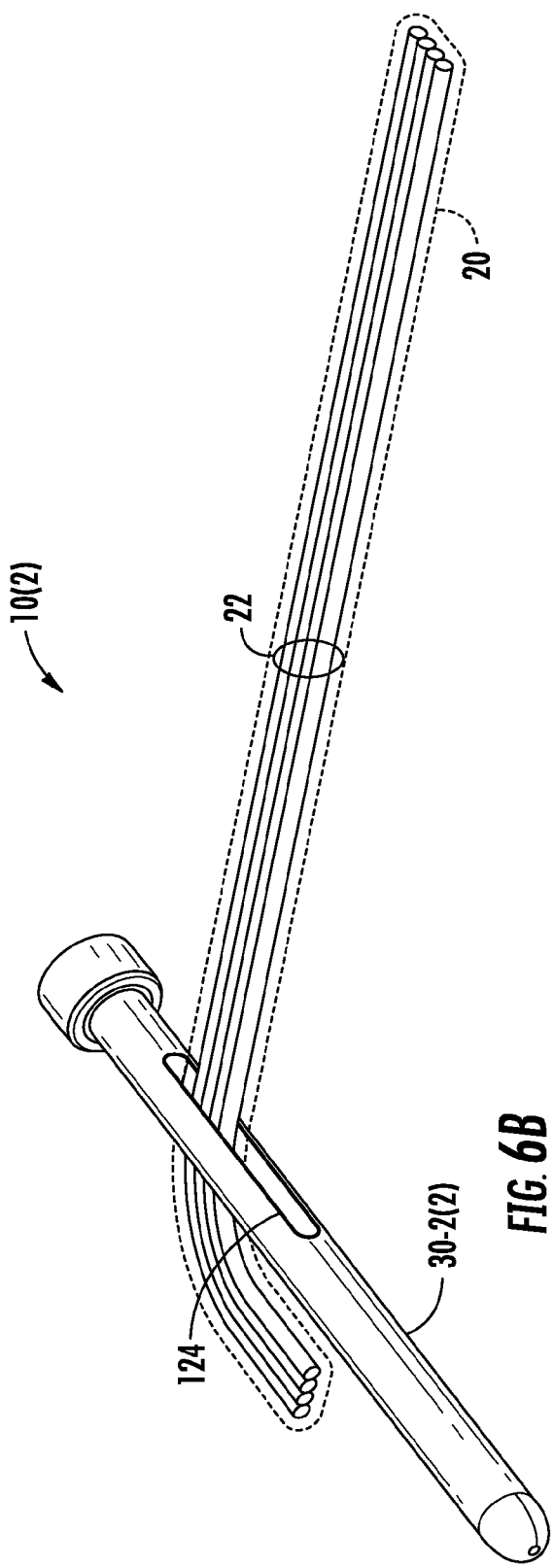

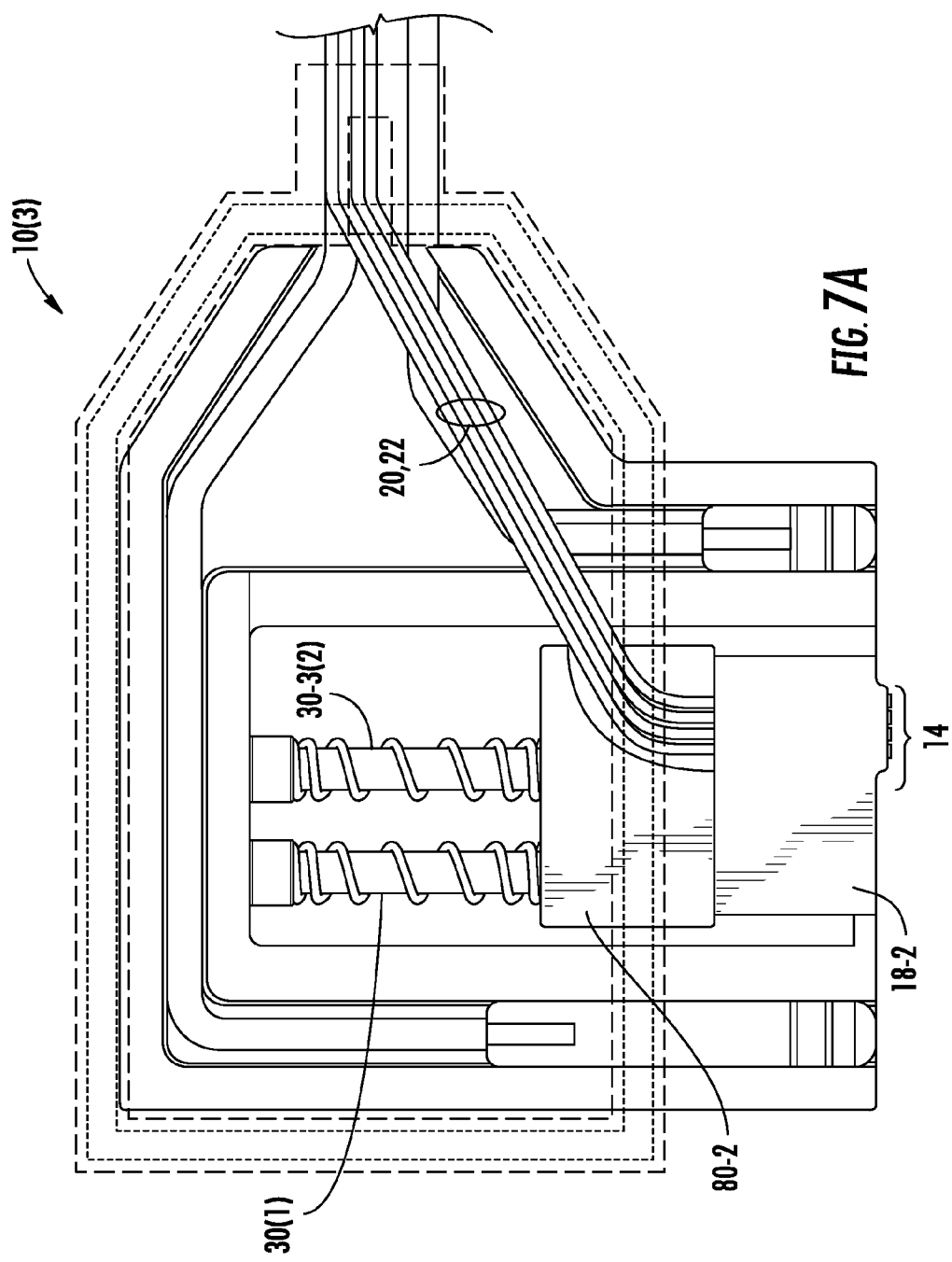

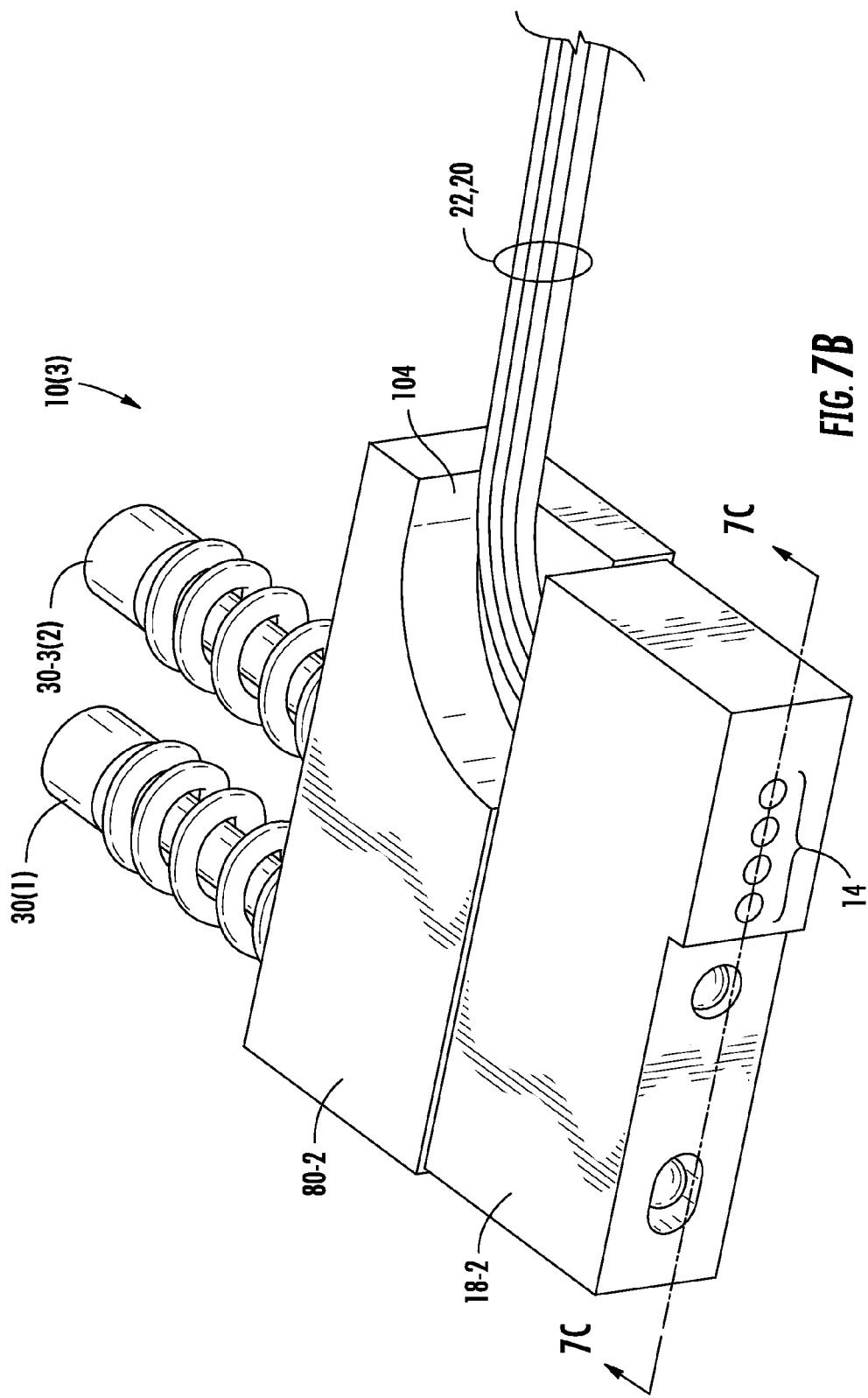

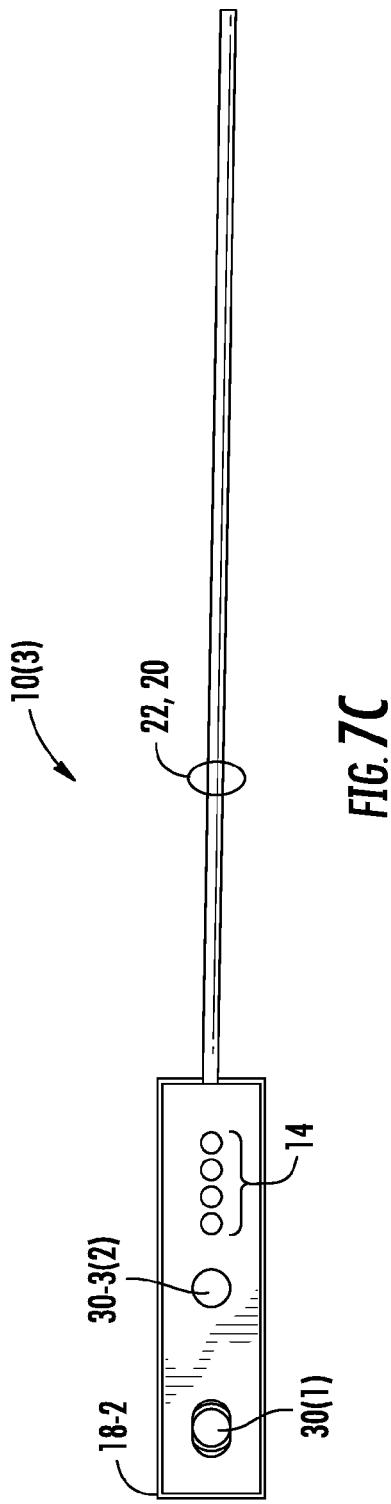

FIBER OPTIC CONNECTORS EMPLOYING MOVEABLE OPTICAL INTERFACES WITH FIBER PROTECTION FEATURES AND RELATED COMPONENTS AND METHODS

CROSS-REFERENCE TO RELATED APPLICATION

This application is a divisional application of and claims the benefit of priority to U.S. application Ser. No. 13/558,978, filed Jul. 26, 2012, which is incorporated herein by reference.

BACKGROUND

Field of the Disclosure

The technology of the disclosure relates to fiber optic connectors having movable optical interfaces supporting optical fiber(s) for making connections with device(s).

Technical Background

Benefits of optical fiber include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linked by optical fibers to provide "live fiber" from one connection point to another connection point. Typically, the optical fibers are terminated in connectors for allowing optical connectivity. As consumer devices evolve they will transmit and receive information at faster data rates and will make a migration from electrical connectors to optical connectors.

Optical devices may exchange one or more of the voice, video and/or data transmission with fiber optic networks. Fiber optic connectors are often used with optical devices to facilitate optically connecting the optical devices at one or more of the connection points. When the fiber optic connector is desired to be optically connected to an optical device, then a mechanical connection may be needed to mechanically secure the fiber optic connector to the optical device. A more secure fiber optic connection permits a better optical connection by ensuring that fiber optic connection is properly aligned between the lenses of the connector and the optical device but current techniques of a movable optical interface result in fiber wear, bending or fatigue of the optical fibers within the fiber optic connector. The wear, bending or fatigue may cause attenuation or optical fiber damage.

SUMMARY OF THE DETAILED DESCRIPTION

Embodiments disclosed herein include fiber optic connectors employing movable optical interfaces with fiber protection features and related components and methods. In one embodiment, the movable optical interface moves between an extended position for cleaning by the user of the movable optical interface and a retracted position to optically connect the fiber optic connector to an optical device in a mechanically-secure manner. Because the fiber optic cable employs the movable optical interfaces, embodiments described herein involve one or more fiber protection features to prevent optical fiber attenuation and/or damage to the end portions of the optical fibers.

In this regard, in one embodiment, a fiber optic connector is disclosed. The fiber optic connector may include a fiber optic connector body comprising a ferrule opening, a fiber optic cable opening, and an internal chamber. The fiber optic connector may also include a movable optical interface configured to move within the internal chamber, the movable optical interface comprising a ferrule and a fiber bend control body. The ferrule may include a mating face configured to be accessible to a user for cleaning. The fiber bend control body may be configured to turn and guide the end portions of the optical fibers disposed in the internal chamber to aid in accommodating the movable optical interface. The movable optical interface may be configured to transmit optical signals from the end portions to an optical device. In this regard, a mechanically-secure connection may be created for fiber optic connectors when the fiber optic cable is not aligned with the fiber lenses.

In another embodiment, a method of making a fiber optic connector that provides fiber bend control of an optical fiber disposed in a fiber optic connector employing a movable optical interface is disclosed. The method may include providing a fiber optic connector body comprising a ferrule opening, a fiber optic cable opening, and an internal chamber. Next, the method may include disposing a movable optical interface in the internal chamber. The movable optical interface may include a ferrule and a fiber bend control body. The ferrule may comprise a mating face configured to be accessible to a user for cleaning. Next, the method may include turning and guiding end portions of optical fibers disposed in the fiber optic connector body with the fiber bend control body. The movable optical interface may be configured to transmit optical signals from the end portions to an optical device.

In another embodiment, a fiber optic connector is disclosed. The fiber optic connector may include a fiber optic connector body which may comprise a ferrule opening, a fiber optic cable opening, and an internal chamber. The fiber optic connector may also include a movable optical interface disposed in the internal chamber. The movable optical interface may be configured to move within the internal chamber. The movable optical interface may receive end portions of optical fibers. The fiber optic connector may also include at least one separation plate disposed adjacent to the movable optical interface and may be configured to provide separation between the end portions of the optical fibers. The fiber lenses may be configured to transmit optical signals from the end portions to an optical device. A fiber optic cable may include the optical fibers which are received through the fiber optic cable opening. In this regard, an expected life of the optical fibers within a movable optical interface will be greater than if the end portions of the optical fibers are not separated and instead allowed to pull or rub abnormally against each other. In this regard, an angled fiber optic connector may be created which may enable mechanically-secure connections with the optical devices.

In another embodiment, a method for making a fiber optic connector that provides separation of optical fibers disposed in a fiber optic connector employing a movable optical interface is disclosed. The method may include providing a fiber optic connector body which may comprise a ferrule opening, a fiber optic cable opening, and an internal chamber. Next the method may include receiving end portions of optical fibers through the fiber optic cable opening. The optical fibers may be included as part of a fiber optic cable. Next the method may include receiving end portions of the optical fibers by the movable optical interface. The movable optical interface may include a ferrule. Next, the method may include disposing at least one separation plate adjacent to the movable optical interface. The at least one separation plate may be configured to provide separation between the end portions of the optical fibers. The movable optical interface may be configured to transmit optical signals from the end portions to an optical device. In this regard, the optical fibers included as part of the fiber optic connectors employing movable optical interfaces may have longer expected lifetimes as well as more secure mechanical connections with optical devices.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 6B is a perspective view of the at least one optical fiber of FIG. 6A routed through the alignment member of FIG. 6A;

FIG. 7A is a top partial view of a third example of the fiber optic connector of FIG. 1A with the movable optical interface in the extended position;

FIGS. 7B and 7C respectively are perspective and front views respectively of the movable optical interface, the optical fibers, and the alignment members of the fiber optic connector of FIG. 7A;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include fiber optic connectors employing a movable optical interface connected by optical fibers to a fiber optic cable, components, and methods. In one embodiment, the movable optical interface moves between an extended position for cleaning by the user of the movable optical interface and a retracted position to optically connect the fiber optic connector to an optical device in a mechanically-secure manner. Generally speaking, the mating face of the movable optical interface is accessible to the user for cleaning at the front end of the connector. Because the fiber optic cable employs the movable optical interfaces, embodiments described herein involve one or more fiber protection features to prevent optical fiber attenuation and/or damage to the end portions of the optical fibers when moving between positions.

Figure 1A:
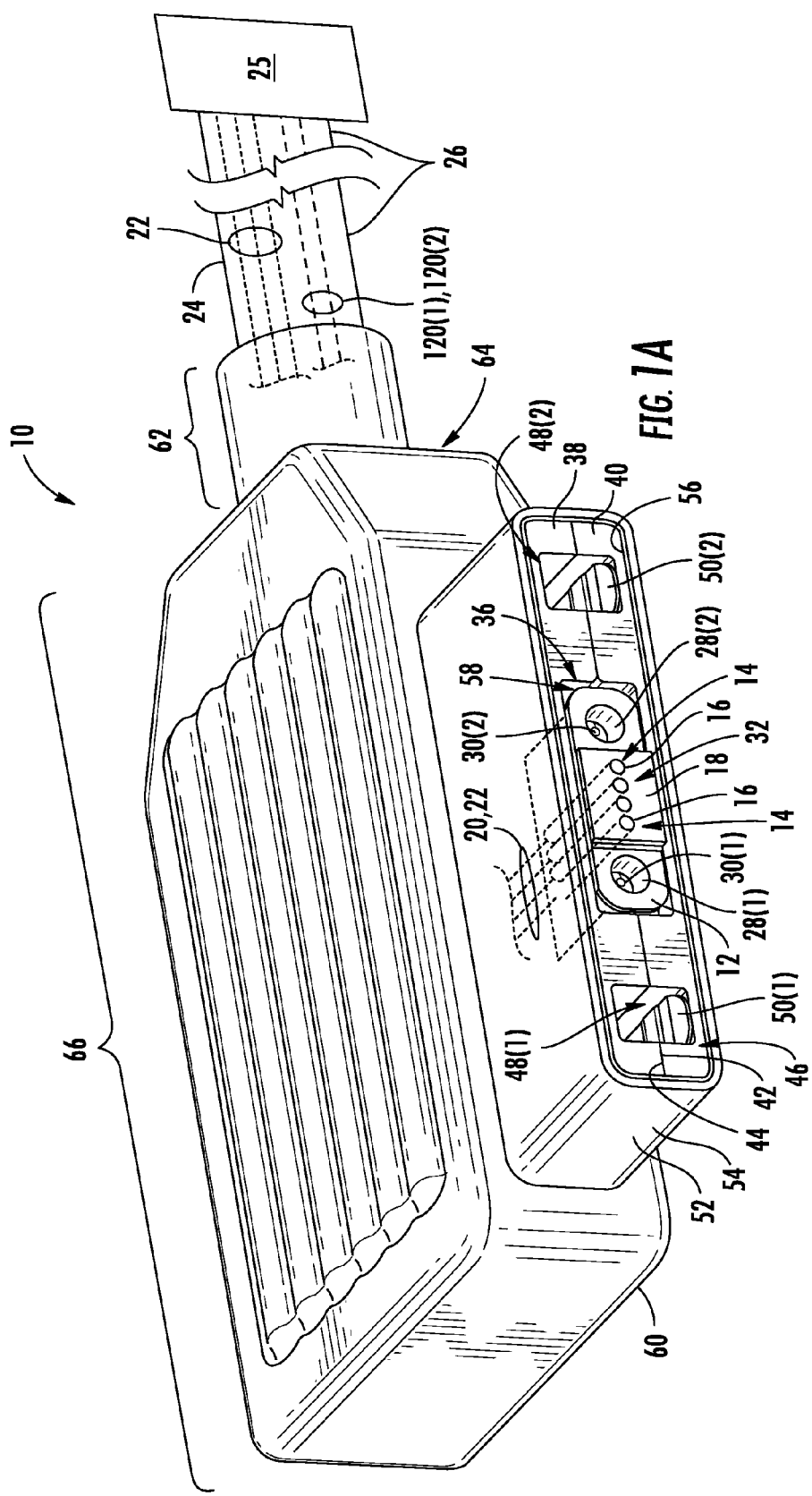
FIG. 1A is a perspective view of a first example of an exemplary fiber optic connector unconnected from an optical device and showing a movable optical interface in an extended position.

In this regard, FIG. 1A is a perspective view of a first example of an exemplary fiber optic connector 10 employing a movable optical interface 12. Before discussing the details of movable optical interface 12, it is important to understand the movable optical interface in the context of fiber protection features. The fiber optic connectors are often used with optical devices. In this regard, in order to obtain a useful optical connection between a fiber optic connector and an optical device it is advantageous to obtain a mechanically-secure connection to align and provide stability to the mating face that has the fiber lenses which must exchange optical data between the fiber optic connector and the optical device. For instance, the fiber lenses may be highly sensitive to angular misalignment which can cause attenuation of the optical data exchange between the fiber optic connector and the optical device. The movable optical interface enables a secure mechanical connection between the fiber optic connector and the optical device by engaging a portion of the optical device within the fiber optic connector to interface with the structural elements of the fiber optic connector. In order to permit the portion of the optical device to enter the fiber optic connector, the ferrule of the fiber optic connector must move to a retracted position during mating. As the ferrule is attached to the optical fibers from the fiber optic cable, the optical fibers must move making them vulnerable to damage and wear which may cause signal attenuation during mating. The fiber protection features of this disclosure benefits the optical fibers by protecting them from damage and wear when moving during operation, which causes signal attenuation when they are forced to move to support the movable optical interface.

Returning to the details of the movable optical interface 12 of the connectors disclosed herein, the movable optical interface 12 may be configured to support and align fiber lenses 14. The fiber lenses 14 may comprise gradient index (GRIN) lenses 16, refractive lenses, or diffractive lenses. The movable optical interface 12 may include a ferrule 18 to hold the fiber lenses 14 in proper alignment. The fiber lenses 14 may be connected to end portions 20 of optical fibers 22 for optical connectivity therebetween. Additionally, the lenses and optical fiber may have any suitable arrangement such as adjacently abutted, use an index-matching material, or fused together as desired. The optical fibers 22 may be part of a fiber optic cable 24 that is attached to the connector for making a cable assembly that may be optically connected to devices in an optical network 25. The fiber optic cable 24 may also include a cable jacket 26 through which the optical fibers 22 are routed for protection within the cable. The optical fibers 22/fiber optic cable 24 may have any suitable length as desired between one or more connectors Moreover, the end portions 20 of optical fibers 22 are portions of the optical fibers 22 disposed between the cable jacket 26 and the fiber lenses 14 (see FIG. 3A).

The ferrule 18 may include one or more alignment openings 28(1), 28(2) through which alignment members 30(1), 30(2) may be externally viewed. The alignment members 30(1), 30(2) may be used to guide the movable optical interface 12 from an extended position 32 shown in FIG. 1A to a retracted position 34 discussed later in relation to FIG. 2A. In this extended position 32 the ferrule 18 may be closest to the exterior and thus the fiber lenses 14 may be most easily cleaned with a soft cloth by a user. The soft cloth may be dry or may include cleaning solvent such as, for example, isopropyl alcohol.

The ferrule 18 may be accessible through a ferrule opening 36 formed by a first inner housing member 38 and a second inner housing member 40. The first inner housing member 38 and the second inner housing member 40 may interface with each other at a first complementary surface 42 and a second complementary surface 44 respectively to form an inner housing 46. The first inner housing member 38 and the second inner housing member 40 may also optionally form electrical connection openings 48(1), 48(1) through which power conductors 50(1), 50(2) respectively are accessible. The power conductors 50(1), 50(2) may be electrically coupled to a first electrical wire 120(1) and second electrical wire 120(2) which may be routed through the cable jacket 26 to minimize a quantity of external cables (i.e., a single hybrid cable) and to provide strain relief to the optical fibers 22 within the cable. Further, the power conductors may be used as strength members along length of the cable in the cable assembly if desired, but other strength members such as tensile yarns are possible if desired.

With continuing reference to FIG. 1A, the fiber optic connector 10 may also include a connector housing 52. The connector housing 52 may include an outer surface 54 and an inner surface 56. The connector housing 52 may surround at least a part of the inner housing 46 in order to keep the first inner housing member 38 and the second inner housing member 40 properly interfaced together. The first inner housing member 38 and the second inner housing member 40 may abut against the inner surface 56 of the connector housing 52. The outer surface 54 of the connector housing 52 may be used to protect the inner housing 46, which includes an internal chamber 58 where the movable optical interface 12 may be disposed.

The connector housing 52 may extend into and be attached to an external structural member 60. The external structural member 60 may be attached to the connector housing 52, the inner housing 46, and the fiber optic cable 24. The external structural member 60 may also be attached to a strain relief boot 62 as shown in the embodiment depicted in FIG. 1A. The strain relief boot 62 may provide bending strain relief to the optical fibers 22 as they enter the external structural member 60 to prevent bending below a minimum bend radius for the fiber optic cable 24 which is specified to prevent damage. The external structural member 60 may be overmolded onto the strain relief boot 62, connector housing 52, the inner housing 46, and about the optical fibers 22 for securing the structure. In some embodiments, the external structural member 60 may be attached to the optical fibers 22 only through the strain relief boot 62. The external structural member 60 may include a fiber optic cable opening 64 by which the fiber optic cable 24 may enter the internal chamber 58. A fiber optic connector body 66 is the main structural assembly of the fiber optic connector 10.

With continuing reference to FIG. 1A, the fiber optic connector body 66 may include the ferrule opening 36, the fiber optic cable opening 64, and the internal chamber 58. The movable optical interface 12 may be disposed in the internal chamber 58 and may be movable within the fiber optic connector body 66.

Figure 1B:
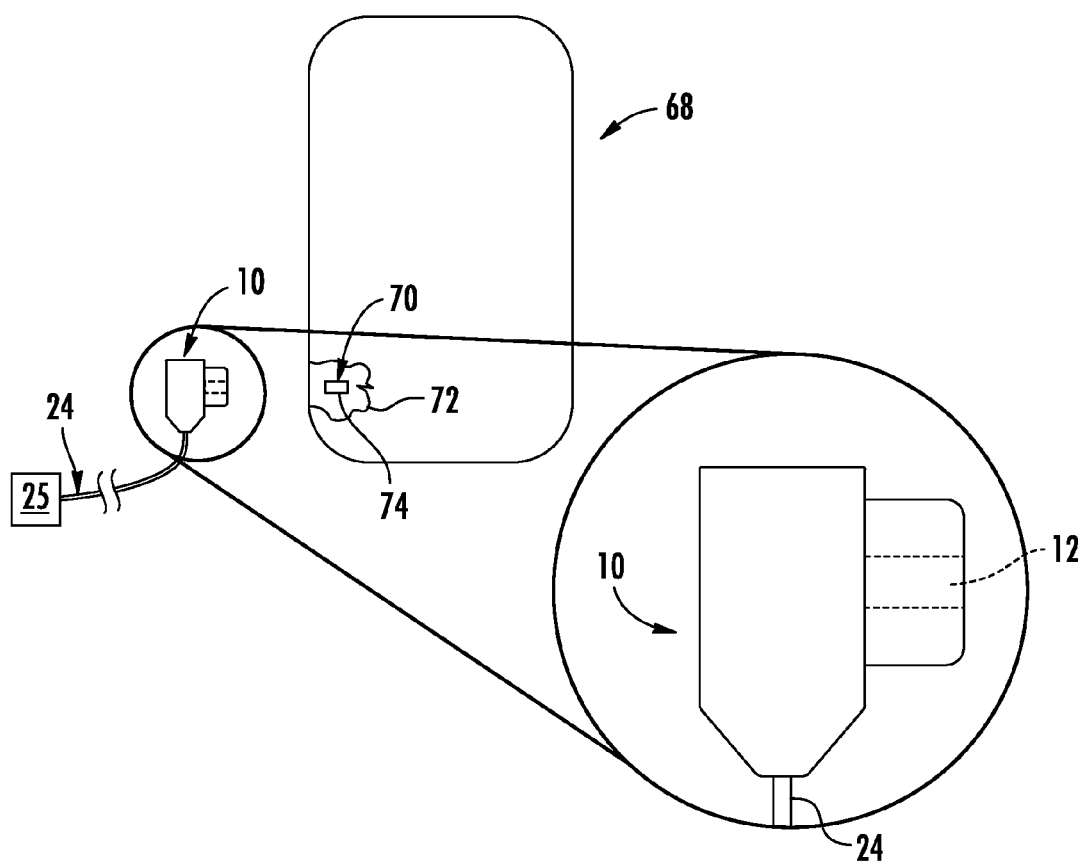
FIG. 1B is a top view of the fiber optic connector of FIG. 1A adjacent to and not optically connected to an exemplary optical device.

FIG. 1B depicts the fiber optic connector 10 of FIG. 1A free from contact and optically uncoupled from a device 68 having an optical connection such as a compatible receptacle. The device 68 may be an information technology-based device with a central processing unit (CPU), for example, a smartphone, capable of exchanging optical information with the optical network 25. The fiber lenses 14 may be configured to transmit optical signals from the end portions 20 of the optical fibers 22 to the device 68. The device 68 may include a complimentary receptacle 70 optically connected to a circuit board 72 of the device 68. The complimentary receptacle 70 may comprise a GRIN lens holder 74. The complimentary receptacle 70 may have electrical consumption conductors (unlabeled) to be electrically coupled to the power conductors 50(1), 50(2).

Figure 2A:
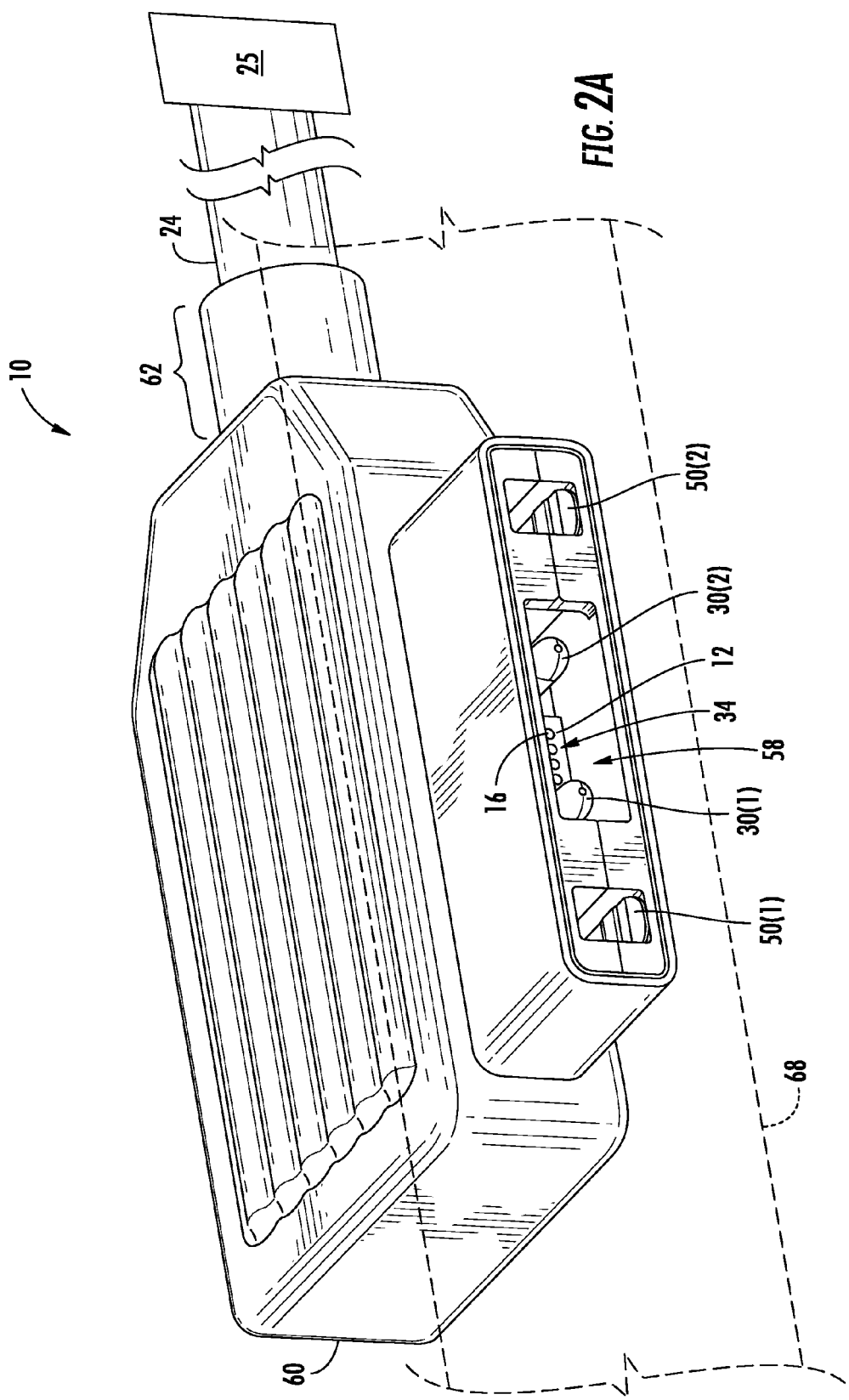
FIG. 2A is a perspective partial view of the fiber optic connector of FIG. 1A optically connected to the optical device of FIG. 1B, wherein the optical surface of the optical device is shown in broken lines for showing the position of the movable optical interface of the fiber optic connector in a retracted position.
Figure 2B:
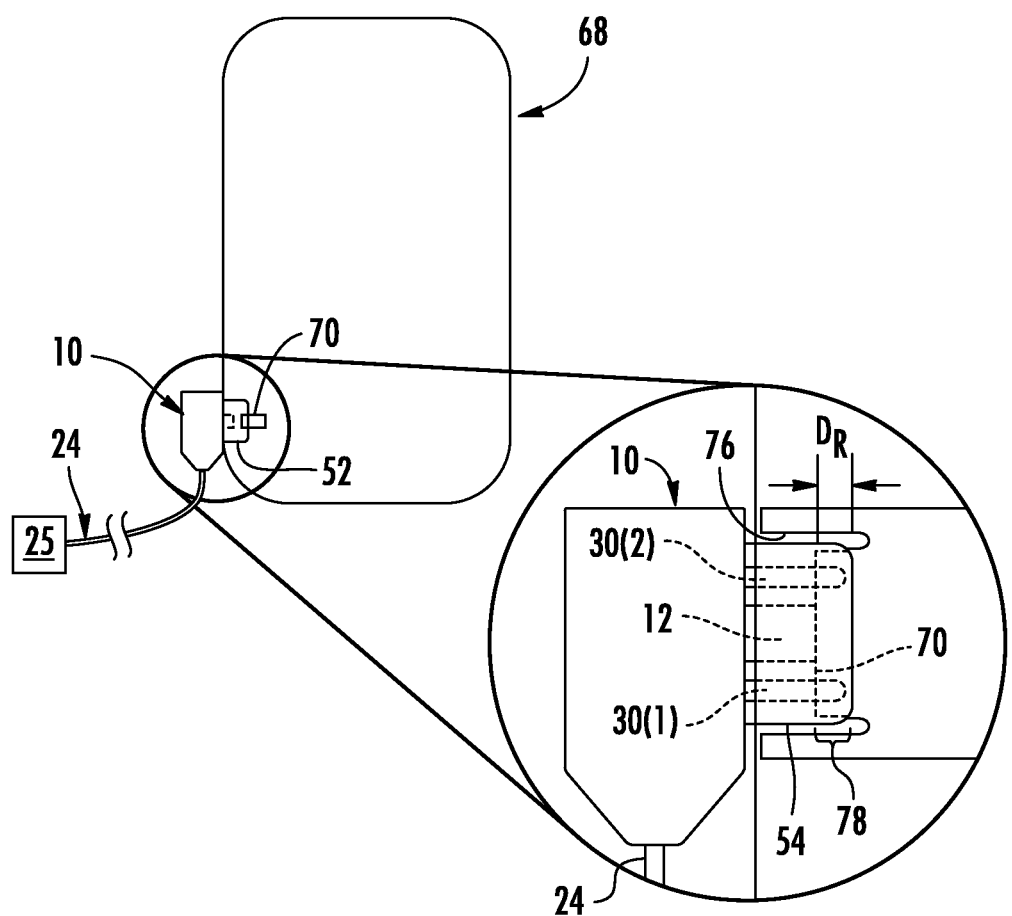
FIG. 2B is a top view of the fiber optic connector of FIG. 1A connected to the optical device of FIG. 1B.

FIG. 2A is a perspective partial view of the fiber optic connector 10 of FIG. 1A in contact and optically connected to the device 68, which is represented by the broken lines. The movable optical interface 12 may be moved back into the internal chamber 58 to the retracted position 34. At the retracted position 34, the fiber lenses 14 may be optically connected to the complimentary receptacle 70 of the device 68 as shown in FIG. 2B. Moving the movable optical interface 12 a distance $D_R$ as shown in FIG. 2B enables a stronger mechanical connection and alignment between the fiber optic connector 10 and the complimentary receptacle 70, which is critical for aligning the fiber lenses 14 relative to the complimentary receptacle 70. In this regard, with continued reference to FIG. 2B, the strong mechanical connection may be achieved by first increasing a contact area between the outer surface 54 of the connector housing 52 and an inner surface 76 of the complimentary receptacle 70, and secondly by receiving a portion 78 of the complimentary receptacle 70 into the internal chamber 58 of the fiber optic connector 10 where the portion 78 may abut against one or more of the alignment members 30(1), 30(2) or against the movable optical interface 12.

It is noted that the distance $D_R$ may be the distance which separates the extended position 32 and the retracted position 34. The distance $D_R$ may be, for example, at least two (2) millimeters and may extend up to 10 millimeters or more as desired.

Figure 3A:
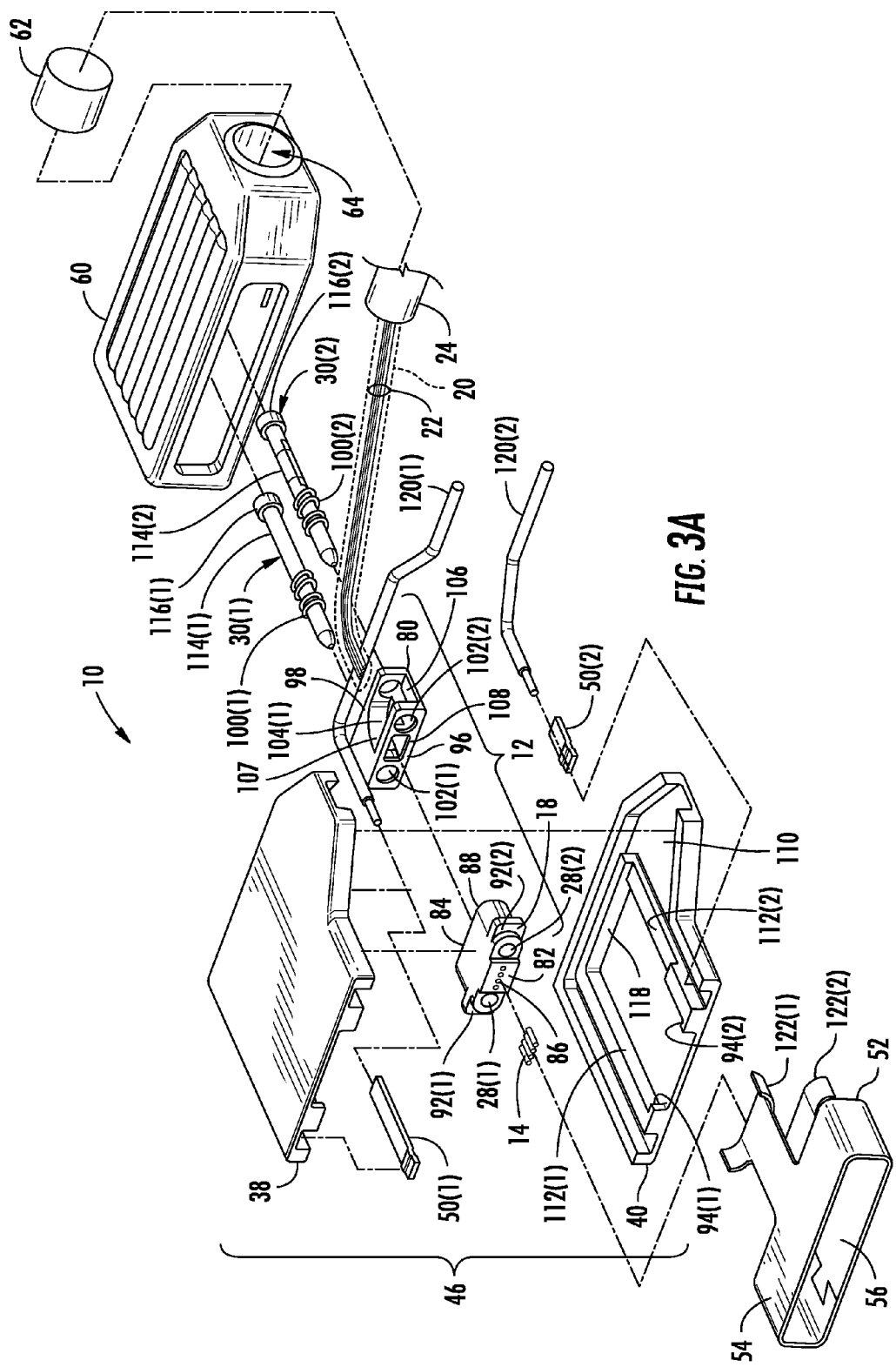
FIG. 3A is a perspective exploded view of the fiber optic connector of FIG. 1A.

Now that various features viewable externally on the fiber optic connector 10 have been introduced, further features internal and external of the fiber optic connector 10 will be discussed in detail. FIG. 3A is an exploded perspective view of the fiber optic connector 10 of FIG. 1A. In this regard, the fiber optic connector 10 may include the movable optical interface 12. As discussed earlier, the movable optical interface 12 enables a secure mechanical connection between the fiber optic connector 10 and the device 68 by allowing the ferrule 18 of the fiber optic connector 10 to retract and a portion of the device 68 to enter and provide support. The movable optical interface 12 may include the ferrule 18 and a fiber bend control body 80. It is noted that the fiber bend control body 80 and the ferrule 18 may be, for example, manufactured as a single integral part (i.e., a monolithic structure) in some embodiments to reduce inventory storage costs or as separate components as depicted in FIG. 3A.

The fiber bend control body 80 is a first example of a fiber protection feature. The fiber bend control body 80 protects the end portions 20 of the optical fibers 22 by guiding them gradually away from areas of the fiber optic connector 10 where the optical fibers 22 could be damaged. As discussed later, the fiber bend control body 80 may include at least one arcuate surface to guide the optical fibers 22 gradually to safer locations. The fiber bend control body 80 is one of many examples of fiber protection features discussed herein to remediate the potential harm to the optical fibers 22 from the movable optical interface 12.

Returning to the details of the movable optical interface 12, the ferrule 18 includes a mating face 82 and a rear surface 84 opposite the mating face 82. The mating face 82 may abut against the complimentary receptacle 70 as depicted in FIG. 2B. The mating face 82 also may include one or more lens bore 86. Each lens bore 86 may allow one of the fiber lenses 14 to be inserted therein. The lens bore 86 may be of a diameter similar to the fiber lenses 14 inserted to closely form a friction fit as to not allow the fiber lenses 14 to move once inserted. In other embodiments, the ferrule may be formed from more than one portion such as a body and a cap used for securing the fiber lenses.

Figure 3B:
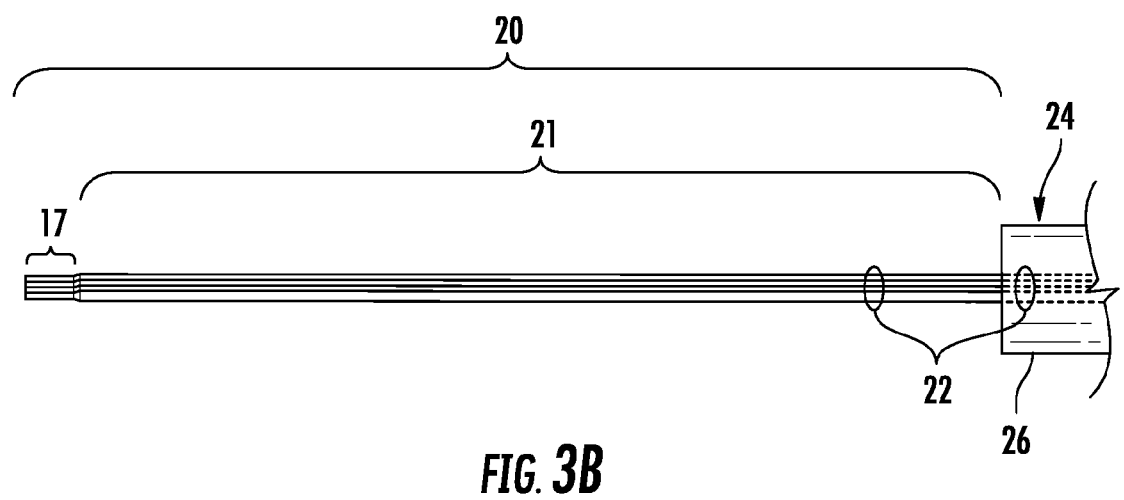
FIG. 3B is a side close-up view of a fiber optic cable, optical fibers, and end portions of the optical fibers of FIG. 3A.
Figure 4:
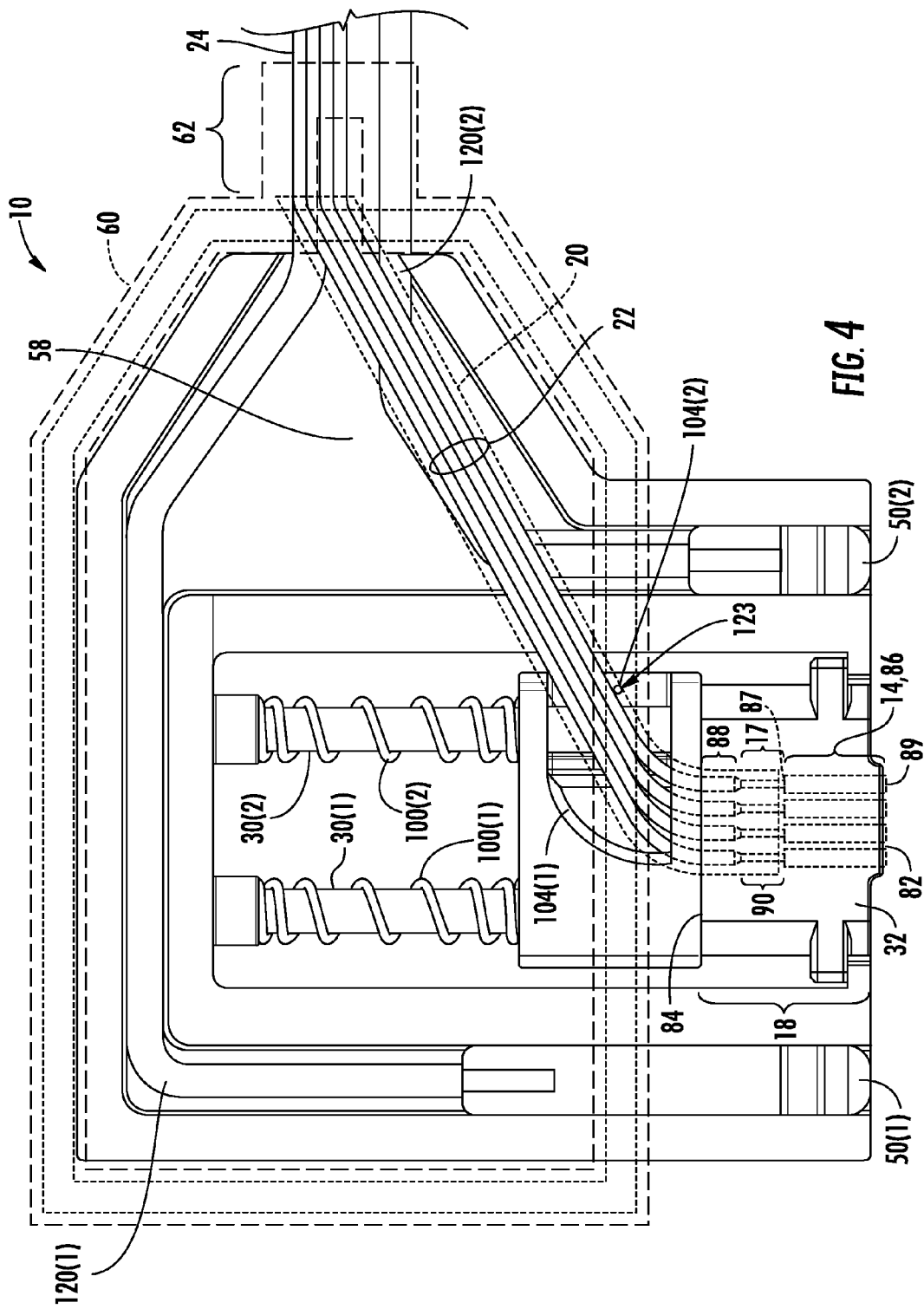
FIG. 4 is a top partial view of the fiber optic connector of FIG. 1A with the movable optical interface disposed in the first extended position, and end portions of optical fibers from a fiber optic cable may be routed across an alignment member.

FIG. 3B depicts details of the end portions 20 of the optical fibers 22. The end portions 20 may include a bare fiber portion 17 and an exposed coated portion 21. The exposed coated portion 21 may be unprotected from the cable jacket 26 and yet be coated for protection and robustness up to the ferrule 18 as shown in FIG. 4. The cable jacket 26 may not be necessary for protection because the end portion may be disposed within the internal chamber 58. The bare fiber portion 17 may not be coated but protected by the ferrule 18 after being routed through the optical fiber openings 88.

As shown in a top partial view depicted in FIG. 4, the ferrule 18 may include at least one optical fiber opening 88. The optical fiber openings 88 allow the end portions 20 of the optical fibers 22 to be received into fiber chambers 90 through the rear surface 84 to be optically aligned with fiber lenses 14 inserted within the lens bore 86 through the mating face 82. The fiber chambers 90 connect the optical fiber openings 88 to the lens bores 86 to enable optical connection between the end portions 20 of the optical fibers 22 and the fiber lenses 14.

In the embodiment shown in FIG. 4, the fiber lenses 14 may be GRIN lenses 16. The GRIN lenses 16 may include a first optical surface 87 and a second optical surface 89 opposite the first optical surface 87. The first optical surface 87 may be configured to receive optical information from the end portions 20 of the optical fibers 22 and transmit the optical information to the device 68 through the second optical surface 89.

With reference back to FIG. 3A, the ferrule 18 may include a first ear surface 92(1) and second ear surface 92(2). The first and second ear surfaces 92(1), 92(2) prevent the movable optical interface 12 from departing from the internal chamber 58 by establishing an interference fit with a first stop surface 94(1) and a second stop surface 94(2) of the second inner housing member 40.

The ferrule 18 may also include a first alignment opening 28(1) and a second alignment opening 28(2). The first and second alignment openings 28(1), 28(2) may receive the first and second alignment members 30(1), 30(2) respectively. The alignment members 30(1), 30(2) guide the movable optical interface 12 between the extended position 32 and the retracted position 34. The ferrule 18 may comprise a hard resilient material with a thermal coefficient of expansion similar to the fiber lenses 14. The hard resilient material used for the ferrule may be, for example, a ceramic, or glass-filled polymer.

The movable optical interface 12 also comprises the fiber bend control body 80. The fiber bend control body 80 includes both an abutment surface 96 and a rearward surface 98 opposite the abutment surface 96. The abutment surface 96 may abut against the ferrule 18 to minimize the routing distance for the optical fibers 22. A minimum routing distance is advantageous because it reduces a length of the optical fibers 22 needed for the fiber optic connector 10 and places less optical fiber at risk for damage. The fiber bend control body 80 may abut against the ferrule 18 and/or adjacent to the optical fiber openings 88 during a range of motion of the movable optical interface 12 between the extended position 32 and the retracted position 34 due to compressive forces from a first compression spring 100(1) and a second compression spring 100(2) which may be mounted concentric to the first and second alignment members 30(1), 30(2).

With continued reference to FIG. 3A, the fiber bend control body 80 may include first and second alignment holes 102(1), 102(2) to receive the first and second alignment members 30(1), 30(2) respectively. The first and second alignment holes 102(1), 102(2) may be aligned with the first and second alignment openings 28(1), 28(2) of the ferrule 18 in order to guide the fiber bend control body 80 while moving between the extended position 32 and the retracted position 34. The fiber bend control body 80 may comprise a strong resilient material, for example, a high-strength polymer to provide the durability to move between the extended position 32 and the retracted position 34, but other suitable materials are possible.

Figure 5:
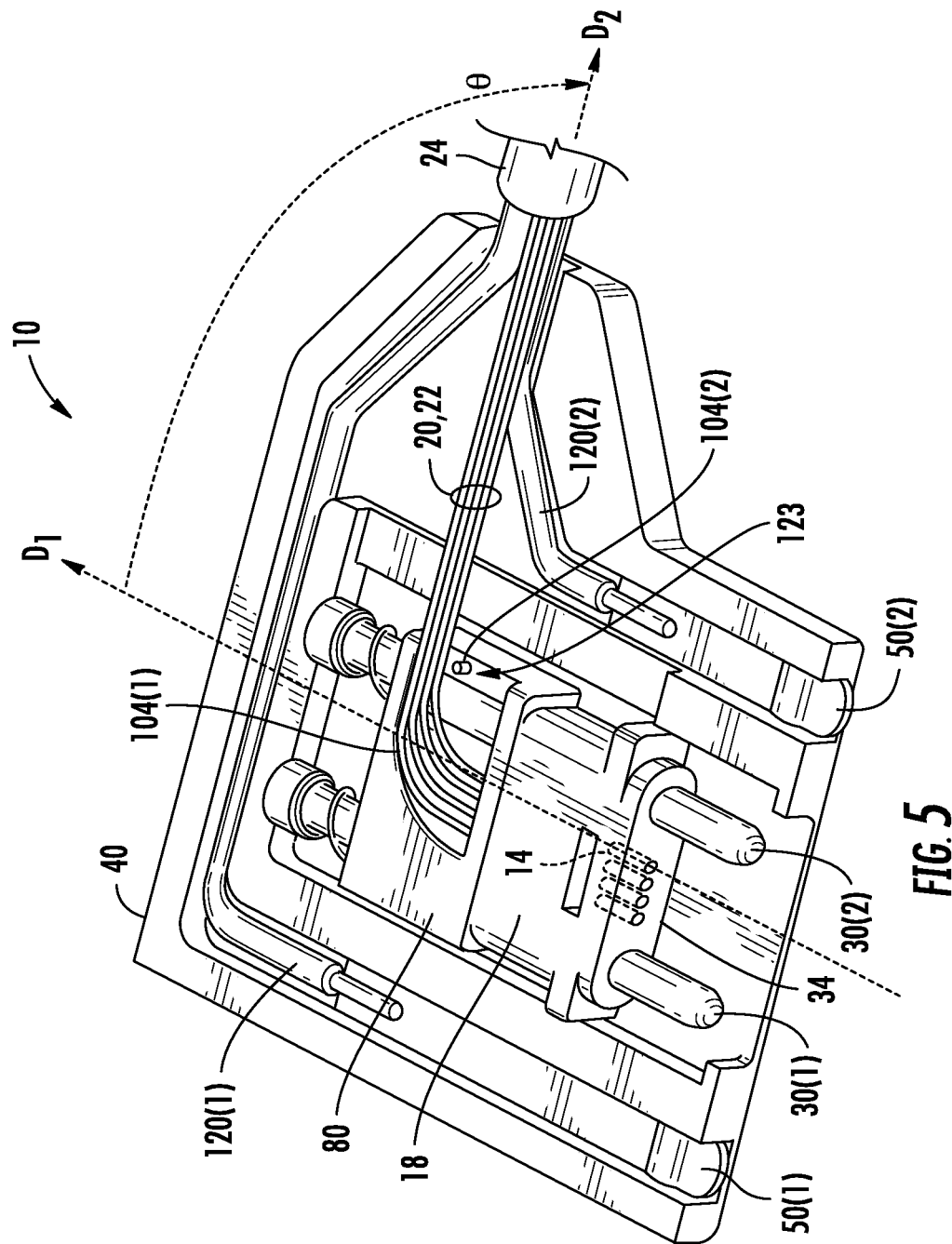
FIG. 5 is a perspective partial view of the fiber optic connector of FIG. 1A with the movable optical interface disposed in the retracted position.

The fiber bend control body 80 may also be configured to provide optical fiber bend control of the end portions 20 of the optical fibers 22 disposed in the fiber optic connector body 66. In this regard, as shown in FIG. 5, the fiber bend control body 80 may include at least one arcuate surface 104 to turn and guide the end portions 20 of the optical fibers 22 from a direction $D_1$ aligned with the fiber lenses 14, to a direction $D_2$ angled from the fiber lenses 14. Routing away from an optical axis of the fiber lenses 14 allows the optical fibers 22 to exit from the fiber optic connector 10 at an angle to form an angled connector, as is preferred for some connection applications. The angle (theta or θ) between $D_1$ and $D_2$ (see FIG. 5) may be, for example, ninety (90) degrees with respect to the fiber lenses 14 when the movable optical interface 12 is in the retracted position 34. The ninety (90) degree angle is also advantageous because in many applications this angle allows the fiber optic cable 24 to exit the fiber optic connector 10 parallel to the device 68 to minimize clutter. Of course, the concepts disclosed herein may be used with other suitable angles as desired such as at least about 15° or more such as 30°, 45°, 60°, 75° or the like.

With continuing reference to FIG. 3A, the at least one arcuate surface 104 may include arcuate surface 104(1) which may turn and guide the end portions 20 of the optical fibers 22 from a first opening 106 of the fiber bend control body 80 to a second opening 108 of the fiber bend control body 80 through passageway 107. The arcuate surface 104(1) may have a gradual curvilinear shape to prevent the end portions 20 of the optical fibers 22 from being damaged. The first opening 106 may be aligned with a fiber entry channel 110 of the inner housing 46, which receives the end portions 20 of the optical fibers 22 at the fiber optic cable opening 64 and guides the end portions 20 to the movable optical interface 12.

The movable optical interface 12 may translate within the internal chamber 58 and may also move in unison with the ferrule 18. The inner housing 46 may be disposed within the internal chamber 58. Additionally, the inner housing 46 may optionally include a first rail guide 112(1) and a second rail guide 112(2) to guide the movable optical interface 12 between the extended position 32 and the retracted position 34, but other arrangements are possible.

As mentioned earlier, the first and second alignment members 30(1), 30(2) are received by first and second alignment openings 28(1), 28(2) and may guide the movable optical interface 12 between the extended position 32 and the retracted position 34. The first and second alignment members 30(1), 30(2) may be a first alignment pin 114(1) and a second alignment pin 114(2) respectively. The first and second alignment pins 114(1), 114(2) may include a first push surface 116(1) and a second push surface 116(2) respectively which may abut against a retention surface 118 of the inner housing 46.

The fiber optic connector 10 may optionally also include the power conductors 50(1), 50(2) accessible by the device 68 through electrical connection openings 48(1), 48(2). The power conductors 50(1), 50(2) may be electrically coupled to first electrical wire 120(1) and second electrical wire 120(2) respectively, which may be routed to exit from the fiber optic cable opening 64 to the optical network 25. The optical network 25 may include a power supply, for example, a direct current (DC) or alternating current (AC) power source. The power conductors 50(1), 50(2) and the first and second electrical wires 120(1), 120(2) may comprise a conductive material, for example, copper or the like.

With continuing reference to FIG. 3A, the connector housing 52 may contain the outer surface 54 and the inner surface 56. The inner surface 56 may abut against at least a portion of the inner housing 46 to keep the first and second inner housing members 38, 40 properly abutting against each other. The movable optical interface 12 may be properly contained within the internal chamber 58 as long as the first and second inner housing members 38, 40 are properly abutting against each other. The connector housing 52 may optionally include a first anchor structure 122(1) and a second anchor structure 122(2). The first and second anchor structures 122(1), 122(2) may improve attachment with the external structural member 60 when the external structural member is overmolded to the connector housing 52. The connector housing 52 may comprise a strong resilient material, for example, stainless steel or aluminum.

As discussed above, the external structural member 60 may overmold over the inner housing 46, the connector housing 52, and the fiber optic cable 24 and/or the strain relief boot 62. The external structural member 60 connects these various portions of the fiber optic connector 10 to make an integral body resistant to damage. The external structural member 60 may comprise, for example, a plastic material.

As shown in FIG. 5, the end portions 20 of the optical fibers 22 may be routed across one of the first and second alignment member 30(1), 30(2). In this embodiment the end portions 20 are routed across the second alignment member 30(2). This routing may allow for the first alignment member 30(1) and the second alignment member 30(2) to be the same design to reduce manufacturing cost as compared to embodiments discussed later. It is also noted that FIG. 5 shows the movable optical interface 12 of the fiber optic connector 10 in the retracted position 34 with the device 68 removed from view for clarity. In this regard FIG. 5 may be contrasted with FIG. 4 where the movable optical interface 12 of the fiber optic connector 10 is in the extended position 32. The extended position 32 allows a user optimal accessibility to the end face of the movable optical interface 12 for cleaning. Access to clean the end face of the movable optical interface 12 is advantageous since dirty fiber lenses 14 may result in undue optical attenuation. The retracted position 34 as opposed to the extended position 32 allows a more mechanically-secure connection between the fiber optic connector 10 and the device 68, as discussed later.

FIGS. 4 and 5 depict at least one optional post 123 which may include another arcuate surface 104(2). The post 123 may be attached to and extend from the second inner housing member 40. The at least one arcuate surface 104 may also comprise the arcuate surface 104(2). The arcuate surface 104(2) may also serve to turn and guide the end portions 20 of the optical fibers 22 from a first opening 106 of the fiber bend control body 80 to a second opening 108 of the fiber bend control body 80 through passageway 107. The arcuate surface 104(2) may have a gradual curvilinear shape to prevent the end portions 20 of the optical fibers 22 from being damaged. The at least one post 123 may be disposed between each of the optical fibers to provide more precise turning and guidance control as desired.

Figure 6A:
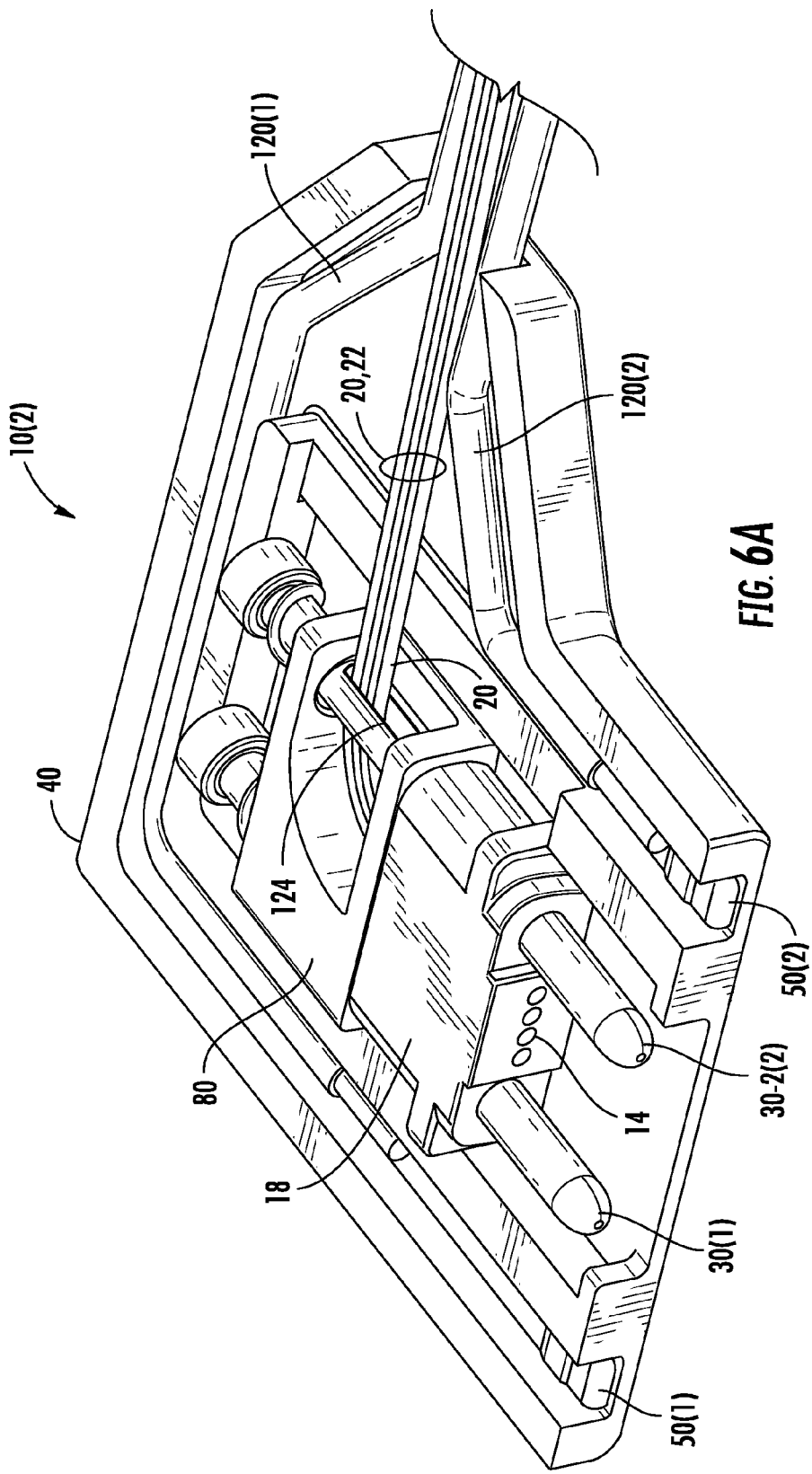
FIG. 6A is a perspective view of a second example of the fiber optic connector of FIG. 1A with the at least one optical fiber routed through an alignment member.

FIG. 6A depicts a second example of the fiber optic connector 10(2). In this second example, the end portions 20 of the optical fibers 22 are routed through one of the at least one of the first and second alignment member 30(1), 30-2(2). In this regard, the second alignment member 30-2(2) may include a passthrough orifice 124. The passthrough orifice 124 enables the fiber lenses 14 to be disposed between the first and second alignment members 30(1), 30-2(2) to optimize alignment of the fiber lenses 14 during optical coupling with the device 68. However, with the passthrough orifice 124, the optical fibers 22 may be free of contact with the second alignment member 30-2(2). Accordingly, wear on the optical fibers 22 associated with contact with the second alignment member 30(2) may be eliminated. FIG. 6B is a perspective partial view depicting the optical fibers 22 routed through the second alignment member 30-2(2) without contact or with reduced contact compared to the embodiment of FIG. 5.

FIG. 7A depicts a third example of the fiber optic connector 10(3), which is similar to the first example. In this third example, the fiber lenses 14 may be shifted to one side of ferrule 18-2 and fiber bend control body 80-2 while the second alignment member 30-3(2) may be shifted towards the first alignment member 30(1) as shown in FIGS. 7B and 7C. The end portions 20 of the optical fibers 22 may be free from contact with the first and second alignment members 30(1), 30-3(1) because the optical fibers 22 are turned away from the second alignment member 30-3(2).

Figure 8A:
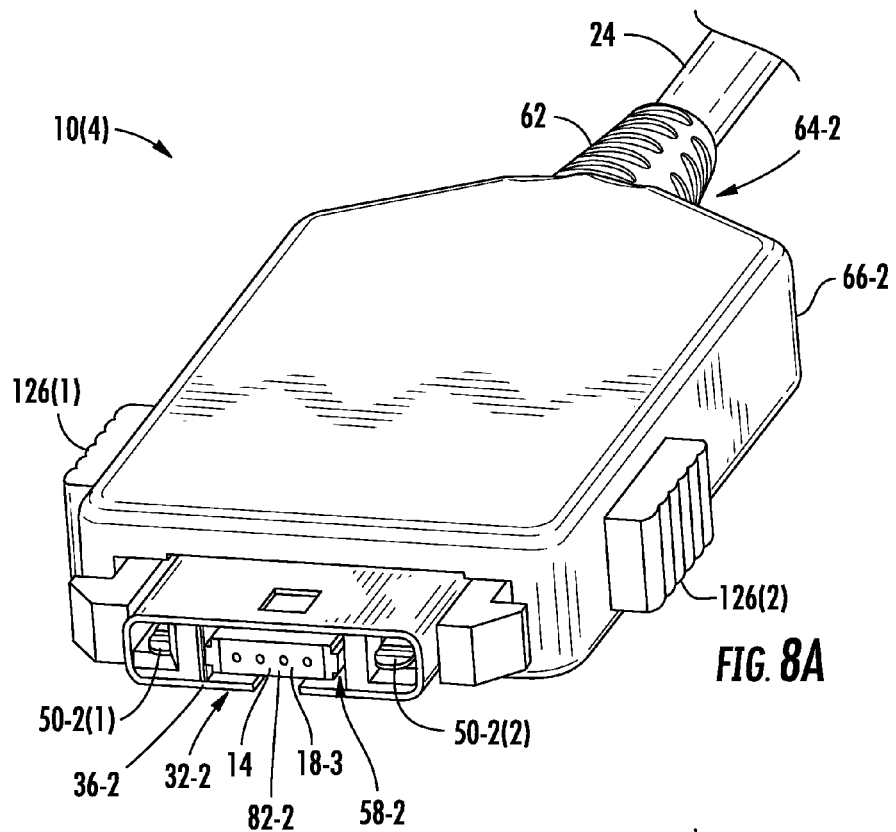
FIGS. 8A and 8B are perspective views of a fourth example of the fiber optic connector of FIG. 1A, unconnected and optically connected respectively to the optical device of FIG. 1B.
Figure 8B:
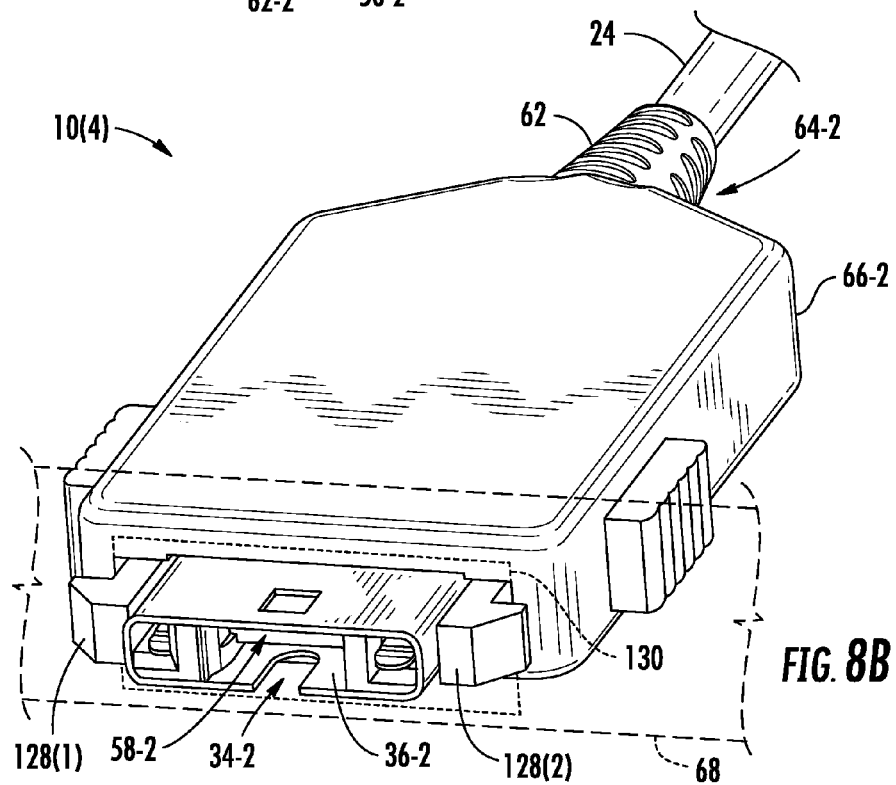

Next is a fourth example of the fiber optic connector 10(4) of FIG. 1A having a straight-through alignment of the cable and ferrule is shown. FIGS. 8A and 8B are perspective views of the fiber optic connector 10(4) wherein the movable optical interface 12-2 is in an extended position 32-2 and a retracted position 34-2 respectively. As may be consistent with earlier embodiments, the extended position 32-2 is when the fiber optic connector 10(4) is not in contact with the device 68 and each of the fiber lenses 14 are close to the ferrule opening 36 to facilitate cleaning. The retracted position is when the movable optical interface 12-2 has been pushed back into the internal chamber 58-2 and is positioned to optically connect with the device 68 as represented by the dashed lines. As is similar in operation and structure with earlier embodiments, the fiber optic connector 10(4) includes a fiber optic connector body 66-2, fiber lenses 14, a ferrule opening 36-2, and first and second power conductors 50-2(1), 50-2(2). It is noted that the fiber lenses 14 are configured to transmit optical signals from the end portions 20 of the optical fibers 22 to the device 68.

Figure 9:
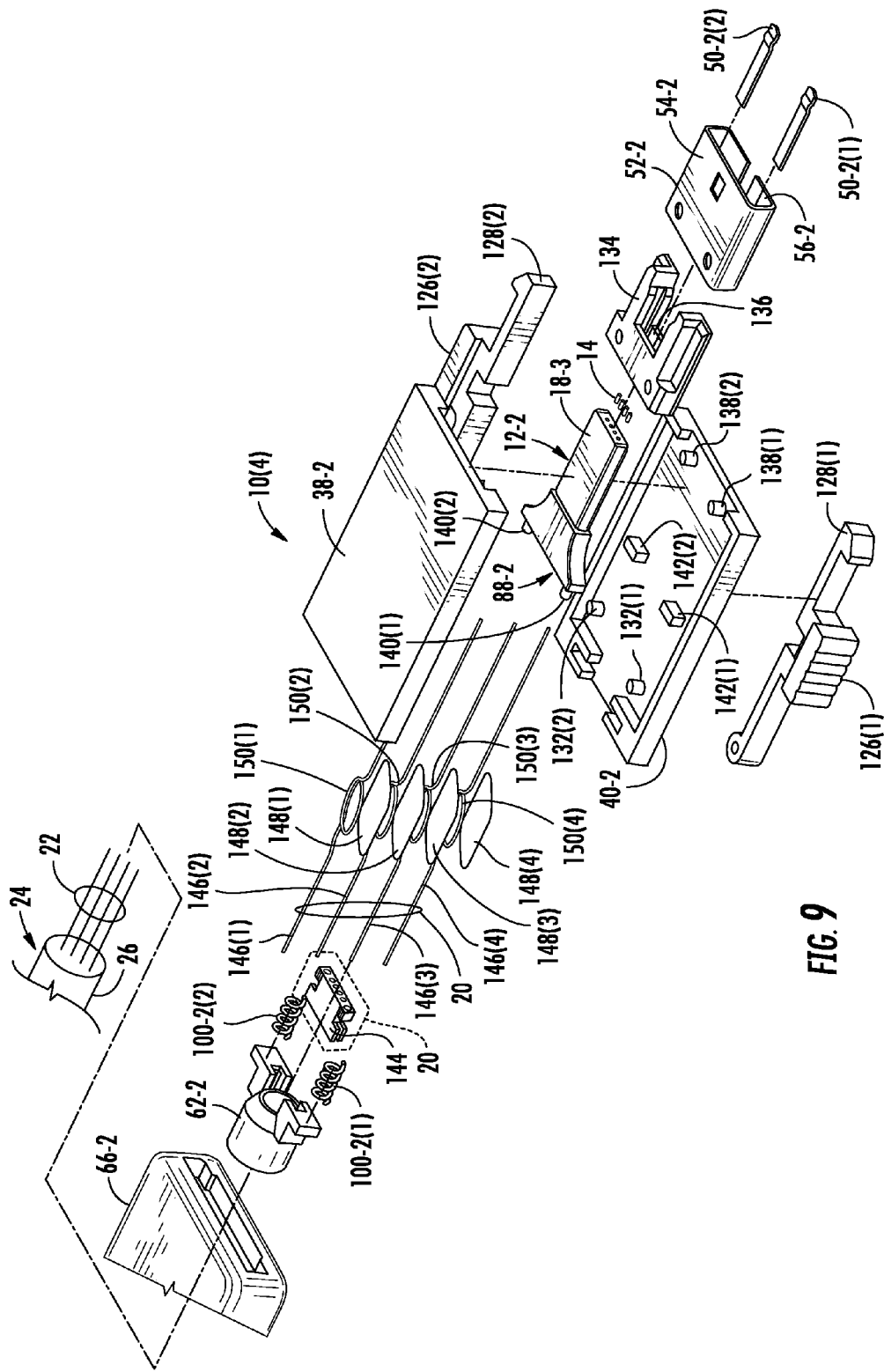
FIG. 9 is a perspective exploded view of the fiber optic connector of FIGS. 8A and 8B.
Figure 10:
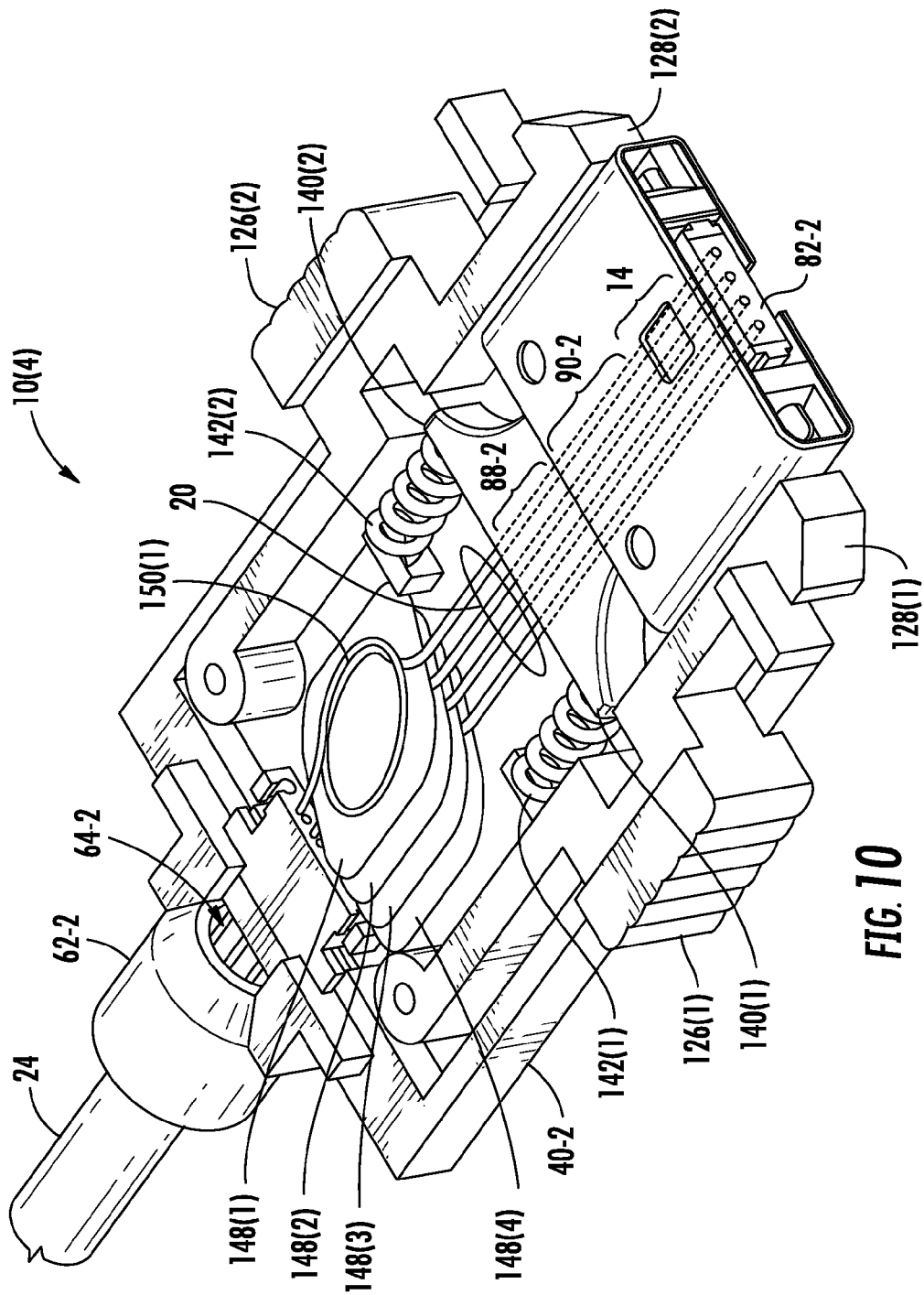
FIG. 10 is a perspective partial view of the fiber optic connector of FIGS. 8A and 8B showing internal details.

FIGS. 9 and 10 show a perspective exploded view and a perspective partial view respectively, of the fiber optic connector 10(4). The fiber optic connector 10(4) may include a first locking member 126(1) and a second locking member 126(2). The first and second locking members 126(1), 126(2) may include a first lock clip 128(1) and a second lock clip 128(2) to attach to an optical device orifice 130 as shown in FIG. 8B. The first and second locking members 126(1), 126(2) may pivot about first and second pivots 132(1), 132(2) of the second inner housing member 40-2.

With continuing reference to FIGS. 9 and 10, the fiber optic connector body 66-2 may include a ferrule opening 36-2, a fiber optic cable opening 64-2, and an internal chamber 58-2. The fiber optic connector 10(4) may further comprise a movable optical interface 12-2 disposed in the internal chamber 58-2 and movable within the fiber optic connector body 66-2. The movable optical interface 12-2 may include a ferrule 18-2. The ferrule 18-2 may include at least one optical fiber opening 88-2 which may be configured to receive the end portions 20 of optical fibers 22 into fiber chambers 90-2 optically aligned with fiber lenses 14 disposed in a mating face 82-2 of the ferrule 18-2. The fiber optic cable 24 includes the optical fibers 22 and is received through the fiber optic cable opening 64-2.

It is noted that the fiber lenses 14 of this embodiment, as well as all embodiments disclosed in this document, may be GRIN lenses 16 having all the features discussed in the first embodiment. Differences between the fiber optic connector 10(4) and the fiber optic connector 10 of FIG. 1A are now further discussed.

The fiber optic connector 10(4) may include a third inner housing member 134 having a sliding orifice 136 to guide the ferrule 18-3 as the ferrule 18-3 moves between the extended position 32-2 and the retracted position 34-2. The third inner housing member 134 may be connected to the second inner housing member 40-2 at a first attachment 138(1) and a second attachment 138(2). A first compression spring 100-2(1) and a second compression spring 100-2(2) may be attached to the movable optical interface 12-2 at a first location 140(1) and second location 140(2) respectively. The first and second compression springs 100-2(1), 100-2(2) may also be attached to the second inner housing member 40-2 at a first feature 142(1) and a second feature 142(2) to bias the movable optical interface 12-2 to the extended position 32-2.

It is noted that a distance $D_R$-2 between the extended position 32-2 and the retracted position 34-2 may be at least two (2) millimeters and may extend up to 10 millimeters or more as desired.

With continuing reference to FIGS. 9 and 10, the end portions 20 of the optical fibers 22 may comprise an optical connector 144 and extension optical fibers 146(1), 146(2), 146(3), 146(4) to optically connect to the optical fibers 22 extending from the fiber optic cable 24.

The fiber optic connector 10(4) may further include at least one separation plate 148(1), 148(2), 148(3), 148(4) disposed adjacent to the at least one optical fiber opening 88-2. The separation plates 148(1), 148(2), 148(3), 148(4) are configured to provide separation between the end portions 20 of the optical fibers 22. In this regard, the separation plates 148(1), 148(2), 148(3), 148(4) prevent the end portions 20 from contacting each other, to avoid increased wear or to prevent interferences which may damage the end portions 20 through bends that are too tight.

Figure 11A:
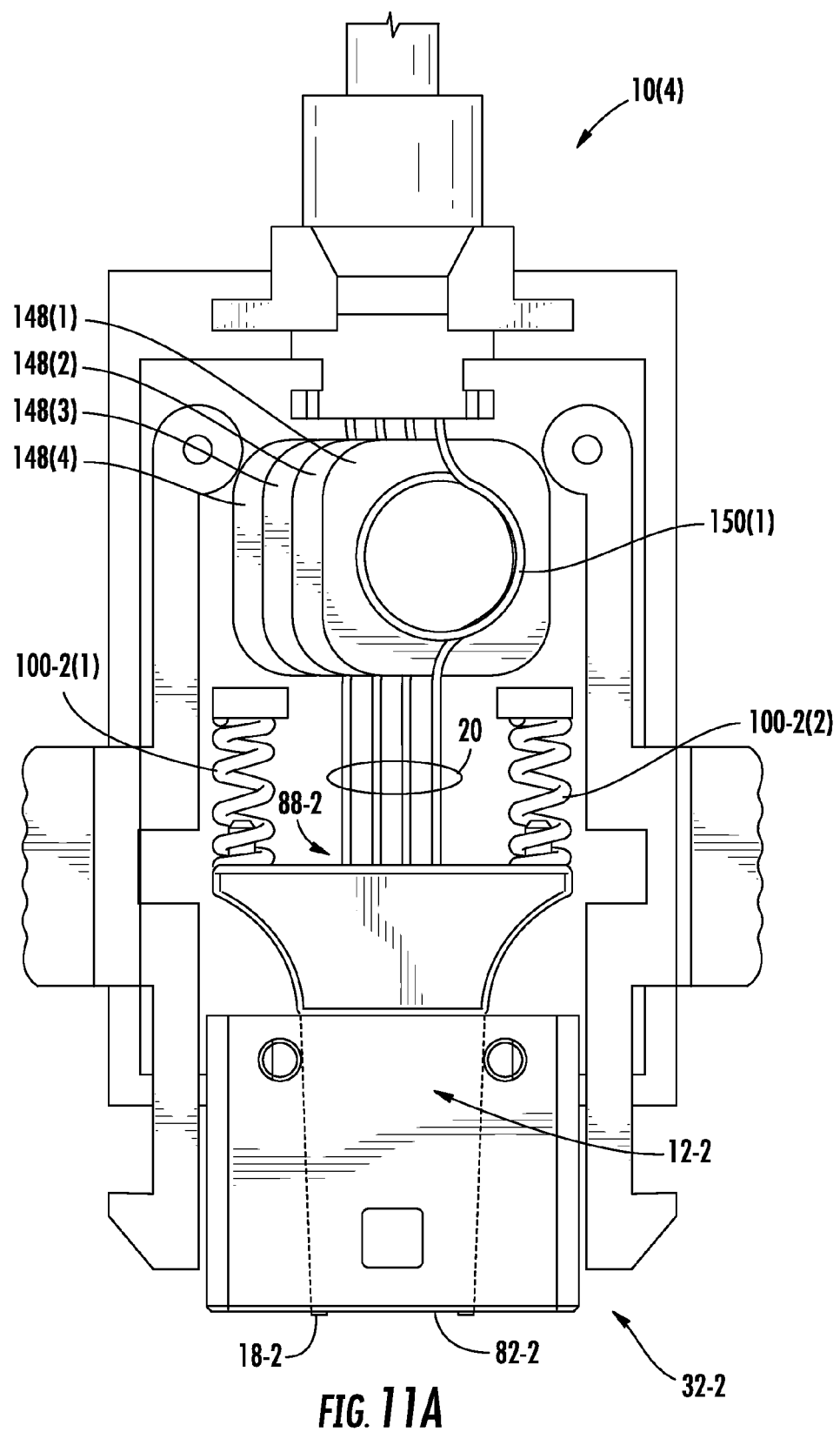
FIGS. 11A and 11B are partial top views of the fiber optic connector of FIGS. 8A and 8B, in the extended position and the retracted position respectively.
Figure 11B:
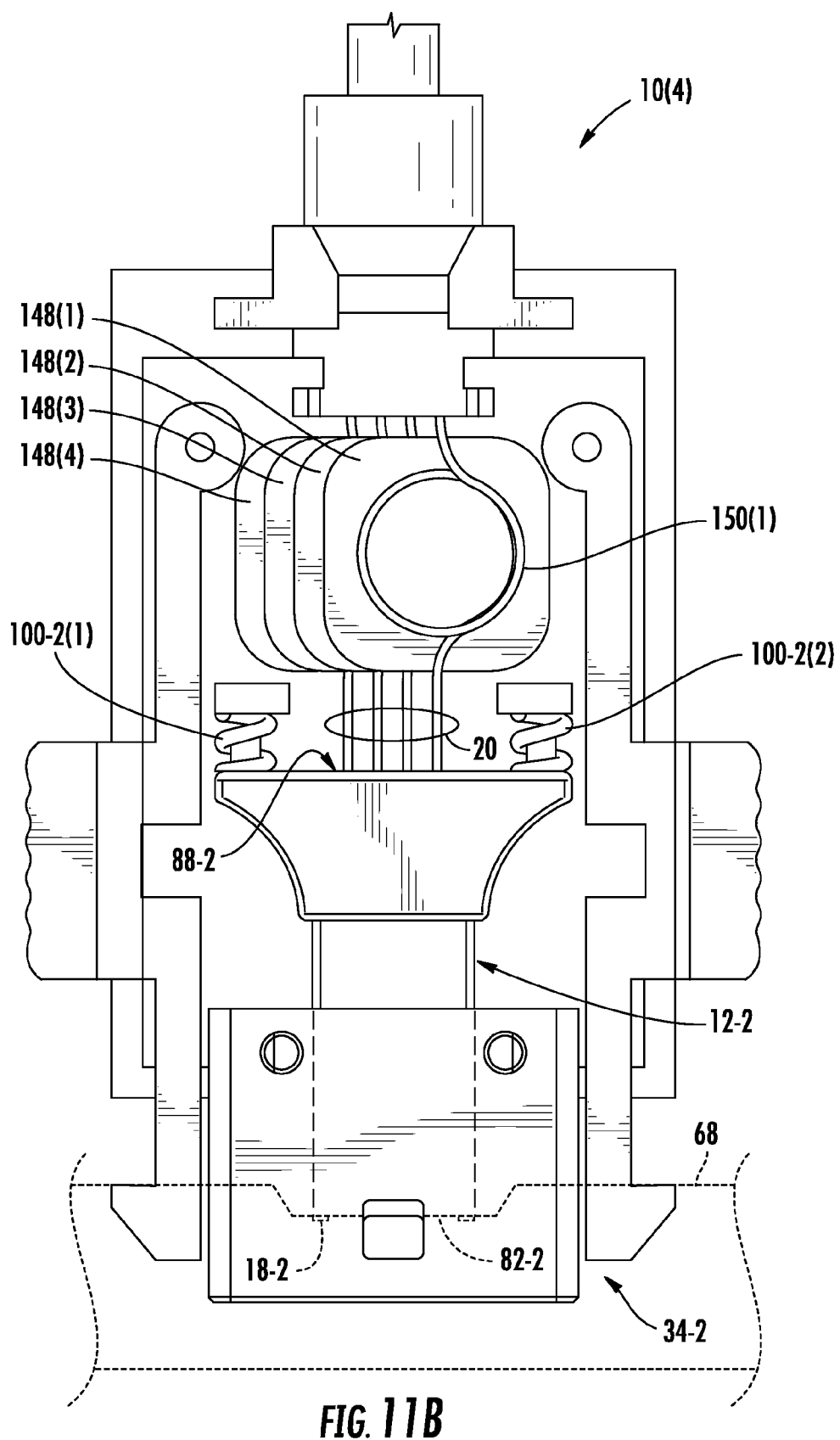

FIGS. 11A and 11B depict partial top views of the fiber optic connector 10(4) in the extended position 32-2 and in the retracted position 34-2 respectively. Each of the optical fibers 22 may include one of a plurality of flexible loop portions 150(1), 150(2), 150(3), 150(4) greater than ninety (90) degrees. For example, a three-hundred sixty (360) degree flexible loop portion 150 would be a full loop shape as depicted in FIGS. 11A and 11B. The plurality of flexible loop portions 150(1), 150(2), 150(3), 150(4) is configured to receive the optical information from the fiber optic cable 24 and transmit the optical information to the fiber lenses 14. The flexible loop portions 150(1), 150(2), 150(3), 150(4) enable a convenient, compact location to store excess optical fiber length when the movable optical interface 12-2 is in the retracted position 34-2 and to retrieve the optical fiber length when the movable optical interface 12-2 returns to the extended position 32-2.

Each of the plurality of flexible loop portions 150(1), 150(2), 150(3), 150(4) may abut against one of at least one separation plate 148(1), 148(2), 148(3), 148(4). Further, one of the separation plates 148(1), 148(2), 148(3), 148(4) may be disposed between one of the plurality of flexible loop portions 150(1), 150(2), 150(3), 150(4) and another of the plurality of flexible loop portions 150(1), 150(2), 150(3), 150(4). In this regard, the flexible loop portions 150(1), 150(2), 150(3), 150(4) are kept separate and opportunities for interference between flexible loop portions 150(1), 150(2), 150(3), 150(4) that could cause kinking and fiber damage are minimized.

The separation plates 148(1), 148(2), 148(3), 148(4) may be made of a thin member, comprising, for example, metal, polymer or the like and may be lubricated with a lubricant, for example, a petroleum-based fluid or other suitable lubricant.

Figure 12:
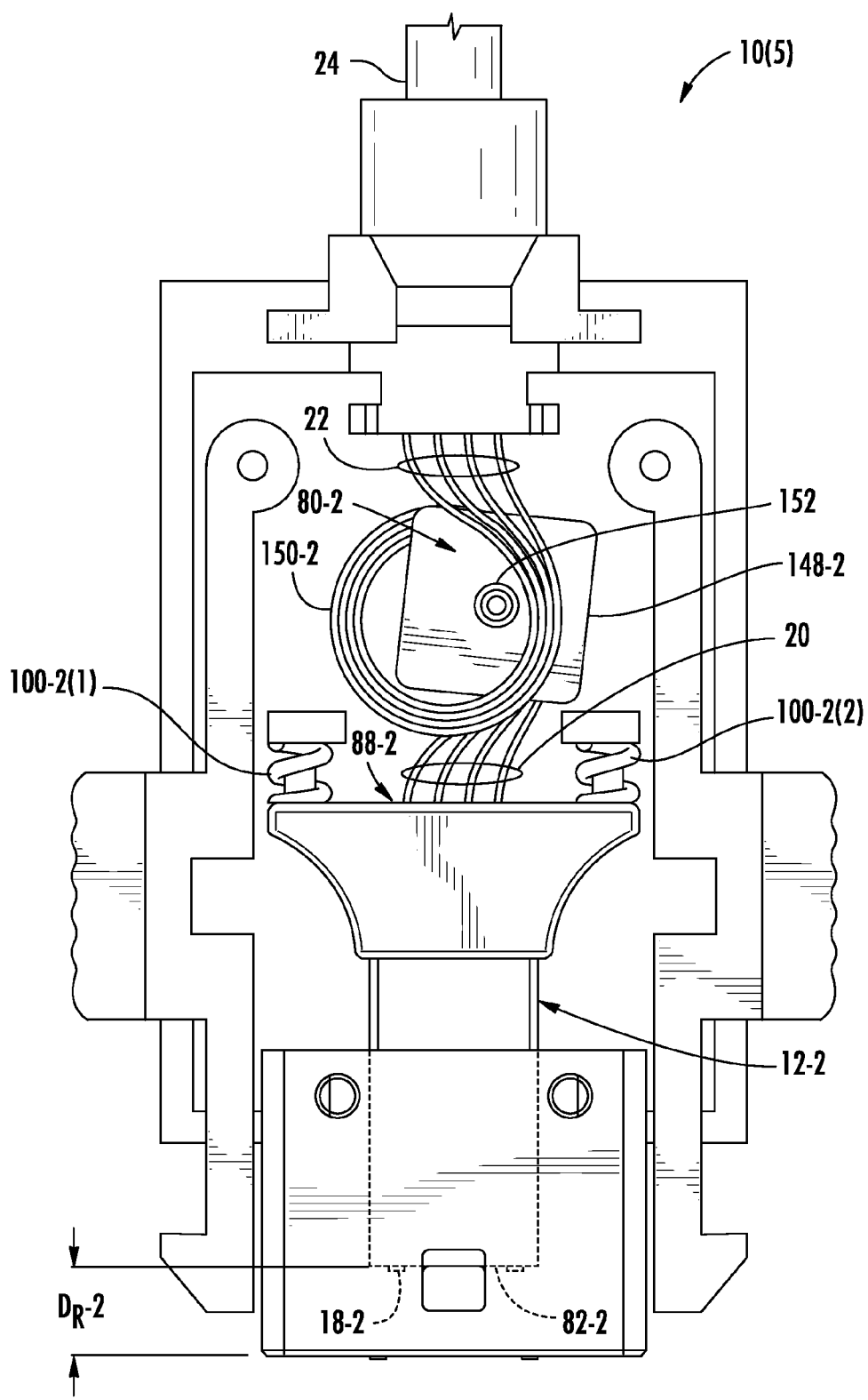
FIGS. 12 and 13 respectively are partial top and perspective exploded views respectively of a fifth example of the fiber optic connector of FIG. 1A.
Figure 13:
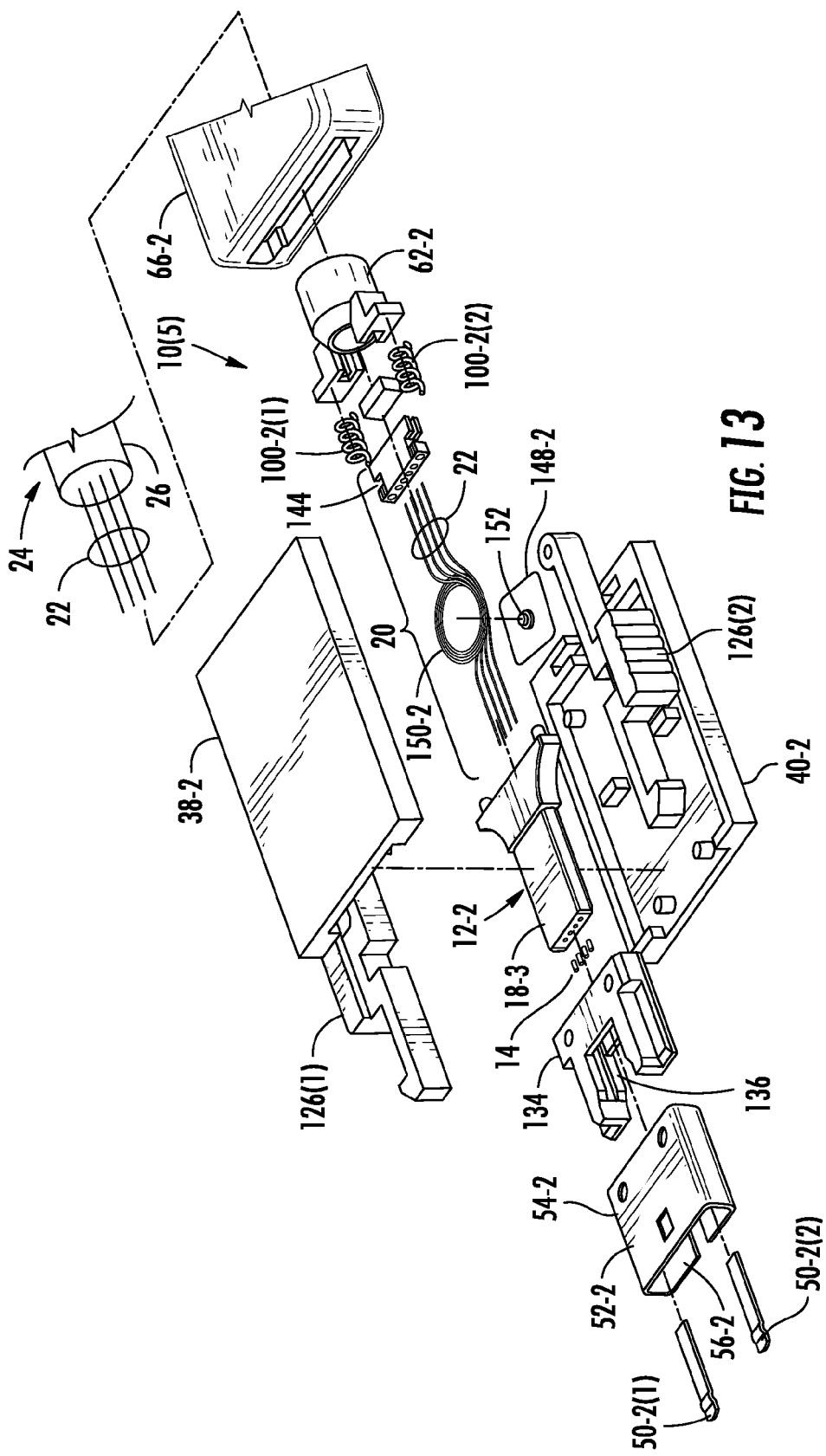

FIGS. 12 and 13 depict a fifth example of the fiber optic connector 10(5) in a partial top view and a perspective exploded view respectively. The fiber optic connector 10(5) may be similar to the fiber optic connector 10(4), except the end portions 20 of the optical fibers 22 may be in a single flexible loop portion 150-2. A single loop may advantageously make assembly more efficient. FIGS. 12 and 13 also show that the fiber bend control body 80-2 may include a single separation plate 148-2 including a boss 152. The boss 152 may be configured to restrict the movement of the end portions 20 of the optical fibers 22. The boss 152 may be disposed within a loop portion 150-2 formed of the end portions 20 of the optical fibers 22, and the loop portion 150-2 abuts against at least one side of the separation plate 148-2. The separation plate 148-2 may be made of a thin member, comprising, for example, metal, and may be lubricated with a lubricant, for example, a petroleum fluid.

Figure 14:
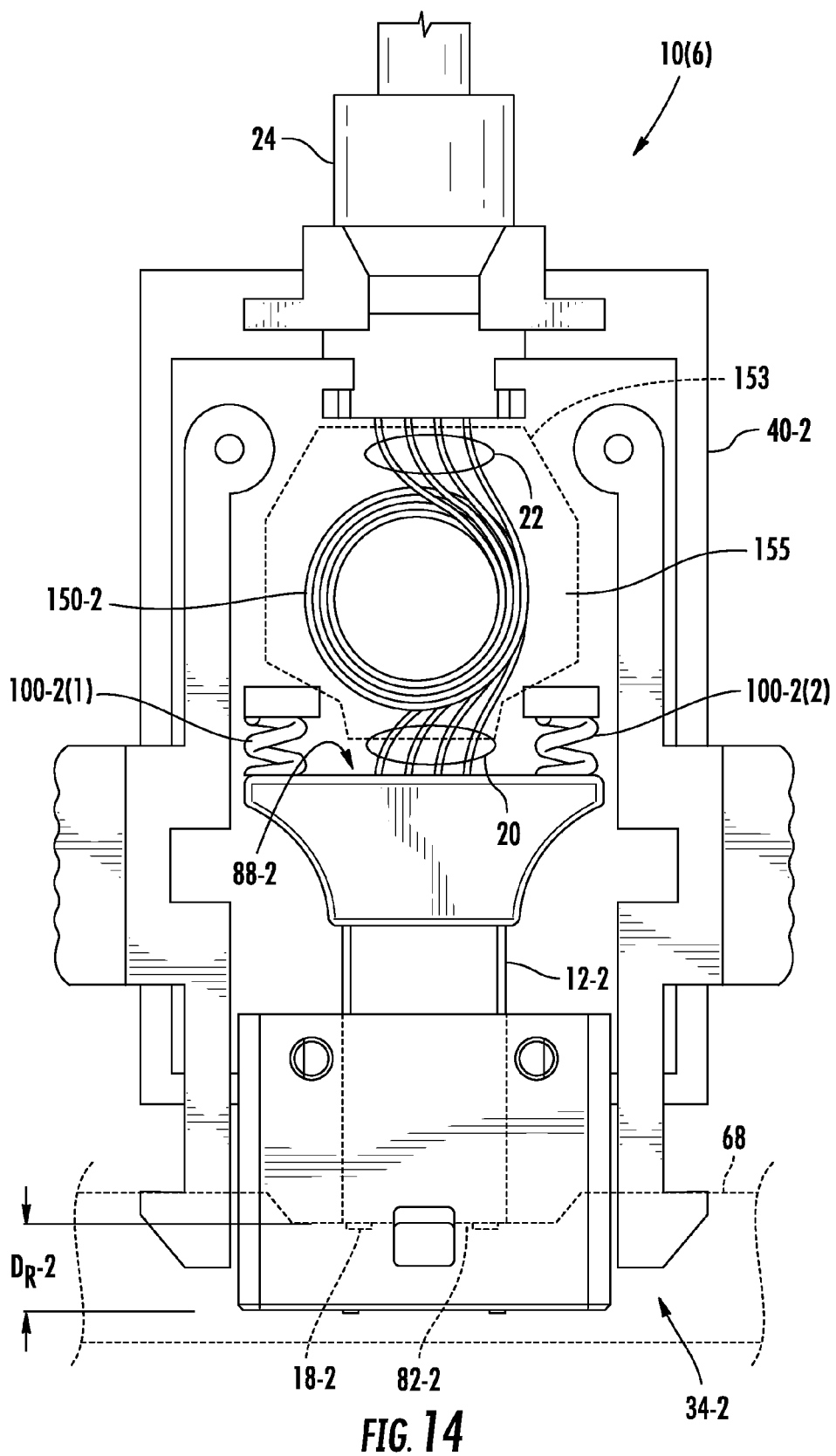
FIG. 14 is partial top view of a sixth example of the fiber optic connector of FIG. 1A.

FIG. 14 depicts a sixth example of the fiber optic connector 10(6) according to the concepts disclosed. The fiber optic connector 10(6) may be similar to the fiber optic connector 10(5) with the omission of the separation plate 148-2 and the boss 152 associated with the separation plate 148-2. The single flexible loop portion 150-2 stores the excess optical fiber length when the movable optical interface 12-2 may be in the retracted position 34-2 (as shown in FIG. 14) and provides the excess optical fiber length when the movable optical interface 12-2 may be in the extended position (as similarly shown in FIG. 11A). The fiber optic connection 10-6 is simpler and more efficient to manufacture because the design is free of the separation plates 148-2. Wear and damage may be avoided in a loop storage region 153 of the second inner housing member 40-2 by making the optical fibers 22 enter at different distances from a containment surface 155 of the second inner housing member 40-2. Alternatively, wear and damage may also be avoided by routing each of the optical fibers 22 at an angle such that a natural stiffness of each of the optical fibers 22 keeps the flexible loop portions 150-2 from contacting each other during translation of the movable optical interface 12.

Figures 15, 16:
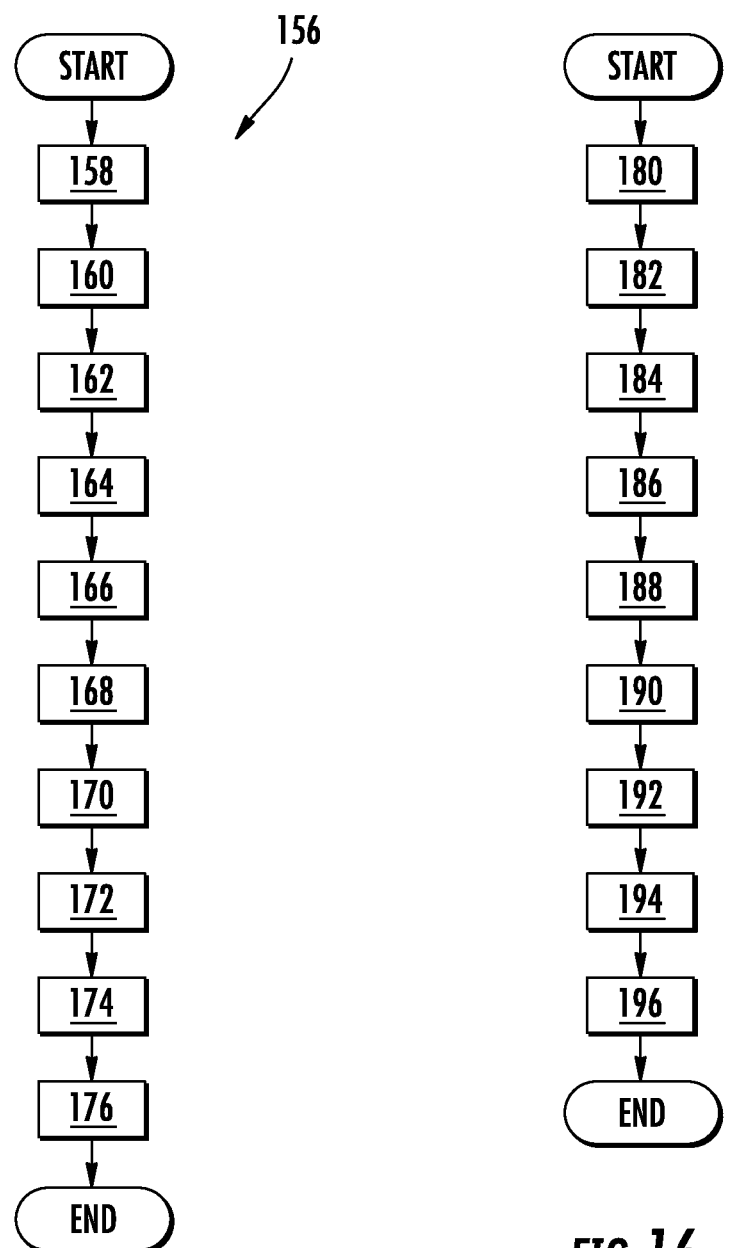
FIG. 15 is an exemplary process for providing fiber bend control of optical fibers disposed in a fiber optic connector employing a movable optical interface.
FIG. 16 is an exemplary process for providing separation of optical fibers disposed in a fiber optic connector employing a movable optical interface.

FIG. 15 provides an exemplary process 156 for making a fiber optic connector that provides fiber bend control of the optical fibers 22 disposed in a fiber optic connector 10 employing a movable optical interface 12. The process in FIG. 15 will be described using the terminology and information provided herein with some steps being optional. The first step in the process may include providing the fiber optic connector body 66 comprising the ferrule opening 36, the fiber optic cable opening 64, and the internal chamber 58 (step 158 in FIG. 15). The next step may include disposing a movable optical interface 12 in the internal chamber 58 (step 160 in FIG. 15). The movable optical interface 12 is movable within the fiber optic connector body 66 upon connection as discussed. The movable optical interface 12 may comprise the ferrule 18 and a fiber bend control body 80.

Next, the end portions 20 of optical fibers 22 may be received into the fiber chambers 90 through the at least one optical fiber opening 88 of the ferrule 18 (step 162 in FIG. 15). The fiber chambers 90 may be optically aligned with the fiber lenses 14 disposed in the mating face 82 of the ferrule 18. The fiber optic cable 24 may include the optical fibers 22 and may be received through the fiber optic cable opening 64.

Next, the fiber bend control body 80 may be disposed adjacent to the at least one optical fiber opening 88 (step 164 in FIG. 15). The next step may include providing optical fiber bend control of the end portions 20 of the optical fibers 22 with the fiber bend control body 80 (step 166 in FIG. 15). The end portions 20 of the optical fibers 22 may be disposed in the fiber optic connector body 66. The fiber lenses 14 are configured to transmit optical signals from the end portions 20 of the optical fibers 22 to an device 68.

As discussed, during assembly and/or mating the movable optical interface 12 is moved between the extended position 32 and the retracted position 34 (step 168 in FIG. 15). The next step may include aligning and terminating the end portions 20 of the optical fibers 22 with the fiber lenses 14 (step 170 in FIG. 15). Next, the end portions 20 of the optical fibers 22 may be turned with the at least one arcuate surface 104 of the movable optical interface 12 from the direction $D_1$ (see FIG. 5) aligned with the fiber lenses 14 to the direction $D_2$ angled from the fiber lenses 14 at an angle theta ($\theta$) (step 172 in FIG. 15). The at least one arcuate surface 104 may turn the end portions 20 of the optical fibers 22 where the angle theta ($\theta$) may be, for example, ninety (90) degrees. Other suitable values for the angle theta ($\theta$) may also be possible.

Further, the movable optical interface 12 may be guided between the extended position 32 and the retracted position 34 with the alignment member 30 of the fiber optic connector 10 (step 174 in FIG. 15). The next step may include routing the end portions 20 of the optical fibers 22 through the one of the at least one alignment member 30 (step 176 in FIG. 15).

FIG. 16 provides an exemplary process 178 for making a fiber optic connector that provides separation of the optical fibers 22 disposed in a fiber optic connector 10 employing the movable optical interface 12. The process in FIG. 16 will be described using the terminology and information provided herein with some steps described being optional. The first step in the process may include providing the fiber optic connector body 66 comprising the ferrule opening 36, the fiber optic cable opening 64, and an internal chamber 58 (step 180 in FIG. 16). Next, the movable optical interface 12 may be disposed in the internal chamber 58 (step 182 in FIG. 16). The movable optical interface may be movable within the fiber optic connector body 66. The movable optical interface 12 may comprise the ferrule 18.

The next step may include receiving the end portions 20 of the optical fibers 22 into the fiber chambers 90 through the at least one optical fiber opening 88 of the ferrule 18 (step 184 in FIG. 16). Next, the fiber chambers 90 may be optically aligned with the fiber lenses 14 disposed in the mating face 82 of the ferrule 18 (step 186 in FIG. 16). The next step may include receiving the optical fibers 22 through the fiber optic cable opening 64 (step 188 in FIG. 16). The fiber optic cable 24 may include the optical fibers 22.

The next step may include disposing the at least one separation plate 154 adjacent to the at least one optical fiber opening 88 to provide separation between the end portions 20 of the optical fibers 22 (step 190 in FIG. 16). The fiber lenses 14 may be configured to transmit optical signals from the end portions 20 of the optical fibers 22 to an device 68. During assembly or mating the movable optical interface 12 is moved between the extended position 32 and the retracted position 34 (step 192 in FIG. 16).

The next step may include forming one of the plurality of the flexible loop portions 150 greater than ninety (90) degrees for each of the optical fibers 22 (step 194 in FIG. 16). The plurality of the flexible loop portions 150 may be configured to receive the optical information from the fiber optic cable 24 and transmit the optical information to the fiber lenses 14. The next step may include providing at least one separation plate 148 configured to prevent one of the flexible loop portions 150 from abutting against another of the flexible loop portions 150 (step 196 in FIG. 16).

As non-limiting examples, the GRIN lenses disclosed herein may comprise a generally cylindrical glass member having a radially varying index of refraction, the glass member having a length such that the lens has a pitch of less than about 0.23. As used herein, the pitch length of the lens, Lo, is $2\pi/A$; the fractional pitch, or, hereafter, pitch, is $L/Lo=LA/2\pi$, where L is the physical length of the lens. In various embodiments, the pitch is between about 0.08 and 0.23, such as, for example, lenses having pitches of 0.22, 0.21, 0.20, 0.19, 0.18, 0.17, 0.16, 0.15, 0.14, 0.13, 0.12, 0.11, 0.10, 0.09 and 0.08. Some embodiments relate to small diameter lenses, such as lenses having a diameter less than or equal to about one (1) millimeter, for example, 0.8 millimeters. In certain embodiments, lenses having a diameter less than about 1 millimeter are operative to produce a beam having a mode field diameter between about 350 microns and 450 microns when illuminated with a beam having a mode field diameter of about 10.4 microns.

Examples of optical devices that can interface with the GRIN lenses disclosed in the GRIN lens holders disclosed herein include, but are not limited to, fiber optic collimators, DWDMs, OADMs, isolators, circulators, hybrid optical devices, optical attenuators, MEMs devices, and optical switches.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other variations of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A fiber optic connector, comprising:
    a fiber optic connector body comprising a ferrule opening, a fiber optic cable opening, and an internal chamber;
    a movable optical interface configured to move within the internal chamber, the movable optical interface receiving end portions of optical fibers; and
    at least one separation plate disposed adjacent to the movable optical interface and configured to provide separation between the end portions of the optical fibers,
    wherein the movable optical interface is configured to transmit optical signals from the end portions to an optical device, and a fiber optic cable includes the optical fibers which are received through the fiber optic cable opening.

2. The fiber optic connector of claim 1, wherein the movable optical interface includes a ferrule, the ferrule includes at least one optical fiber opening configured to receive the end portions of the optical fibers into fiber chambers optically aligned with fiber lenses disposed in a mating face of the ferrule, the at least one separation plate disposed adjacent to the at least one optical fiber opening, and the mating face configured to be accessible to a user for cleaning.

3. The fiber optic connector of claim 2, wherein each of the optical fibers includes one of a plurality of flexible loop portions greater than ninety (90) degrees, the plurality of flexible loop portions is configured to receive optical information through the fiber optic cable opening and transmit the optical information to the fiber lenses.

4. The fiber optic connector of claim 3, wherein the at least one separation plate is configured to prevent the one of the plurality of flexible loop portions from abutting against another of the plurality of flexible loop portions.

5. The fiber optic connector of claim 4, wherein each of the plurality of flexible loop portions abuts against one of at least one separation plate, and one of the at least one separation plate is disposed between one of the plurality of flexible loop portions and another of the plurality of flexible loop portions.

6. The fiber optic connector of claim 1, wherein the movable optical interface is configured to move between an extended position and a retracted position.

7. The fiber optic connector of claim 6, wherein the extended position and the retracted position are separated by at least two (2) millimeters.

8. A method of making a fiber optic connector that provides separation of optical fibers disposed in the fiber optic connector employing a movable optical interface, comprising:
    providing a fiber optic connector body comprising a ferrule opening, a fiber optic cable opening, and an internal chamber;
    receiving end portions of optical fibers through the fiber optic cable opening, the optical fibers are included as part of a fiber optic cable;
    receiving the end portions of the optical fibers by the movable optical interface, the movable optical interface comprising a ferrule; and
    disposing at least one separation plate adjacent to the movable optical interface to provide separation between the end portions of the optical fibers,
    wherein the movable optical interface is configured to transmit optical signals from the end portions of the optical fibers to an optical device.

9. The method of claim 8, further comprising:

receiving the end portions of optical fibers into fiber chambers through at least one optical fiber opening of the ferrule, the fiber chambers are optically aligned with fiber lenses disposed in a mating face of the ferrule;

cleaning the mating face which is accessible to a user for cleaning; and receiving the optical fibers through the fiber optic cable opening, the optical fibers are included as part of a fiber optic cable.

10. The method of claim 9, further comprising moving the movable optical interface between an extended position and a retracted position, wherein the at least one separation plate is disposed adjacent to the at least one optical fiber opening.

11. The method of claim 9, further comprising forming one of a plurality of flexible loop portions greater than ninety (90) degrees for each of the optical fibers, wherein the plurality of flexible loop portions is configured to receive optical information through the fiber optic cable opening and transmit the optical information to the fiber lenses.

12. The method of claim 11, further comprising providing at least one separation plate configured to prevent one of the plurality of flexible loop portions from abutting against another of the plurality of flexible loop portions.

* * * * *